United States Patent
Yang et al.

(10) Patent No.: US 11,823,194 B2
(45) Date of Patent: Nov. 21, 2023

(54) DECENTRALIZED BIOMETRIC AUTHENTICATION PLATFORM

(71) Applicant: REDROCK BIOMETRICS INC, San Francisco, CA (US)

(72) Inventors: Hua Yang, Millbrae, CA (US); Leonid Kontsevich, San Francisco, CA (US); Kevin Horowitz, Sherman Oaks, CA (US); Igor Lovyagin, Deerfield, IL (US)

(73) Assignee: REDROCK BIOMETRICS, INC., San Francisco, CA (US)

( * ) Notice: Subject to any disclaimer, the term of this patent is extended or adjusted under 35 U.S.C. 154(b) by 5 days.

(21) Appl. No.: 16/964,981

(22) PCT Filed: Jan. 28, 2019

(86) PCT No.: PCT/US2019/015465
§ 371 (c)(1),
(2) Date: Jul. 25, 2020

(87) PCT Pub. No.: WO2019/148130
PCT Pub. Date: Aug. 1, 2019

(65) Prior Publication Data
US 2021/0049611 A1    Feb. 18, 2021

(30) Foreign Application Priority Data

Jan. 27, 2018   (CN) .............................. 201810080360

(51) Int. Cl.
*G06Q 40/00*    (2023.01)
*G06Q 20/40*    (2012.01)
(Continued)

(52) U.S. Cl.
CPC ....... *G06Q 20/40145* (2013.01); *G06F 16/27* (2019.01); *G06Q 20/1085* (2013.01);
(Continued)

(58) Field of Classification Search
CPC ......... G06Q 20/40145; G06Q 20/1085; G06Q 20/389; G06F 16/27; H04L 9/3242; H04L 62/0861; H04L 67/10
(Continued)

(56) References Cited

U.S. PATENT DOCUMENTS 9,935,947 B1   4/2018 Machani
10,594,487 B2 *  3/2020 Anglin .................. H04L 9/3226
(Continued)

FOREIGN PATENT DOCUMENTS

GB    2563742    * 12/2017  ............. G06F 21/32
WO    WO-2017066002 A1 * 4/2017  ......... G06F 16/1805
(Continued)

OTHER PUBLICATIONS

Hammudoglu et al., "Portable Trust: biometric-based authentication and blockchain storage for self-sovereign identity systems," arXiv: 1706.30744v1 Jun. 12, 2017 (Year: 2017).*
(Continued)

*Primary Examiner* — Abhishek Vyas
*Assistant Examiner* — William B. Bunker
(74) *Attorney, Agent, or Firm* — Brad Bertoglio; Intelink Law Group, P.C.

(57) ABSTRACT

A biometric authentication platform (10) uses fault-tolerant distributed computing to determine if a supplied biometric sample and a sample stored in a registry are from the same person. A collection of reference samples is maintained in a distributed ledger (115) with immutable history of modifications. Results of matching are stored in a separate distributed ledger (125) providing an immutable history log. Coordinated use of both ledgers (115, 125) enable biometric authentication of registered users (140) in real time. Users
(Continued)

(140) may interact with providers (150) and/or trusted circles of other users in order to recover user records from the user ledger (115).

26 Claims, 18 Drawing Sheets

(51) Int. Cl.

| | | |
|---|---|---|
| G06F 16/27 | (2019.01) | |
| G06Q 20/10 | (2012.01) | |
| G06Q 20/38 | (2012.01) | |
| H04L 9/32 | (2006.01) | |
| H04L 9/40 | (2022.01) | |
| H04L 67/10 | (2022.01) | |
| G06Q 50/26 | (2012.01) | |

(52) U.S. Cl.
CPC ......... *G06Q 20/389* (2013.01); *H04L 9/3242* (2013.01); *H04L 63/0861* (2013.01); *H04L 67/10* (2013.01); *G06Q 50/265* (2013.01); *G06Q 2220/00* (2013.01)

(58) Field of Classification Search
IPC ...................................................... G06Q 40/00
See application file for complete search history.

(56) References Cited

U.S. PATENT DOCUMENTS

| | | | | |
|---|---|---|---|---|
| 10,826,703 | B1* | 11/2020 | Shipley | ............... G06F 16/1805 |
| 2008/0019573 | A1 | 1/2008 | Baltatu | |
| 2009/0172036 | A1 | 7/2009 | Marx | |
| 2011/0126024 | A1 | 5/2011 | Beatson et al. | |
| 2017/0046709 | A1* | 2/2017 | Lee | ....................... G06Q 20/065 |
| 2018/0048461 | A1* | 2/2018 | Jutla | ................... G06Q 20/3829 |
| 2018/0068130 | A1* | 3/2018 | Chan | ..................... G06F 21/606 |
| 2018/0113752 | A1* | 4/2018 | Derbakova | ........... H04L 9/3239 |
| 2018/0242944 | A1 | 8/2018 | Uber, III | |
| 2018/0253539 | A1 | 9/2018 | Minter | |
| 2018/0288022 | A1* | 10/2018 | Madisetti | ........... G06Q 20/3829 |
| 2018/0323964 | A1 | 11/2018 | Watanabe | |
| 2019/0058708 | A1 | 2/2019 | Wagner | |
| 2019/0130086 | A1* | 5/2019 | Tovey | ....................... G07C 9/37 |
| 2019/0139047 | A1* | 5/2019 | Rønnow | ................... H04L 9/50 |
| 2019/0188697 | A1* | 6/2019 | Wu | ..................... G06Q 20/3678 |
| 2019/0188711 | A1* | 6/2019 | Wu | ..................... G06Q 20/3678 |
| 2020/0021446 | A1 | 1/2020 | Roennow et al. | |
| 2020/0042685 | A1* | 2/2020 | Tussy | ....................... G06F 21/32 |
| 2021/0243029 | A1* | 8/2021 | Wang | ................... G06F 21/602 |

FOREIGN PATENT DOCUMENTS

| | | | | |
|---|---|---|---|---|
| WO | WO-2018089098 A1 * | 5/2018 | ............. | G06F 21/32 |
| WO | WO2018096052 A1 | 5/2018 | | |
| WO | WO-2018222211 A1 * | 12/2018 | ............. | G06F 21/32 |
| WO | WO2019032113 | 2/2019 | | |
| WO | WO-2019032113 A1 * | 2/2019 | ............. | G06F 21/32 |
| WO | WO2019125041 A1 | 6/2019 | | |
| WO | WO-2019126471 A1 * | 6/2019 | ............. | G06F 21/32 |

OTHER PUBLICATIONS

Lim et al., "Blockchain technology—the identity management and authentication service disruptor," Heriot Watt University, 10.18517/ijaseit.8.4-2.6838 2018 (Year: 2019).*

Belchoir et al., "A Survey on Blockchain Interoperability: Past, Present, and Future Trends," arXiv: 2005.14282v3 Mar. 22, 2021 (Year: 2021).*

Bommagani et al., "A Framework for Secure Cloud-Empowered Mobile Biometrics," IEEE Military Communications Conference 2014 (Year: 2014).*

Sergey Tulyakov, Faisal Farooq, Praveer Manskhani, Venu Govindaraju; ScienceDirect; Symmetric hash functions for secure fingerprint biometric systems; Pattern Recognition Letters 28 (2007) 2427-2436; Center for Unified Biometrics and Sensors, State University of New York at Buffalo, Amherst, NY 14228, USA.

* cited by examiner

| ULID 200 | TEMPLATE 210 | STATUS 220 | NONCE 230 | REGISTERED DEVICE 240 |
|---|---|---|---|---|

FIG. 2

| | 400A | 400B |
|---|---|---|
| 401 | List 1 ID | List 2 ID |
| 402 | Device 1 ID : $E_{PuK\text{-}Dev_1}$("Family members") | Device 1 ID : $E_{PuK\text{-}Dev_1}$("Coworkers") |
| | Device 2 ID : $E_{PuK\text{-}Dev_2}$("Family members") | Device 2 ID : $E_{PuK\text{-}Dev_2}$("Coworkers") |
| 403 | Min votes: 2 | Min votes: 4 |
| 404 | $ULID_{MOM}$ : CONFIRMED | $ULID_{MOM}$ : CONFIRMED |
| | $ULID_{DAD}$ : CONFIRMED | $ULID_{DAD}$ : CONFIRMED |
| | $ULID_{Mary}$ : PENDING | $ULID_{Mary}$ : PENDING |
| | | $ULID_{JACK}$ : PENDING |

| 300A | 300B | 310A | 310B | 310C |
|---|---|---|---|---|
| Device 1 ID 302A | Device 2 ID 302B | Provider 1 ID | Provider 2 ID | Provider 3 ID |
| PuK-Dev1 304A | PuK-Dev2 304B | Trusted: No | Trusted: No | Trusted: Yes |
| | | $E_{PrK\text{-}Prov_1}$("Gold Gym acct#123") | $E_{PrK\text{-}Prov_2}$("Loyalty Program acct#456") | $E_{PrK\text{-}Prov_3}$("Chase Bank checking") |
| | | Device 1 ID : $E_{PuK\text{-}Dev_1}$(PU-Prov1) | Device 1 ID : $E_{PuK\text{-}Dev_1}$(PU-Prov2) | Device 1 ID : $E_{PuK\text{-}Dev_1}$(PU-Prov3) |
| | | Device 2 ID : $E_{PuK\text{-}Dev_2}$(PU-Prov1) | Device 2 ID : $E_{PuK\text{-}Dev_2}$(PU-Prov2) | Device 2 ID : $E_{PuK\text{-}Dev_2}$(PU-Prov3) |
| | | Provider 3 ID : $E_{PuK\text{-}Prov_3}$(PU-Prov1) | Provider 3 ID : $E_{PuK\text{-}Prov_3}$(PU-Prov2) | |

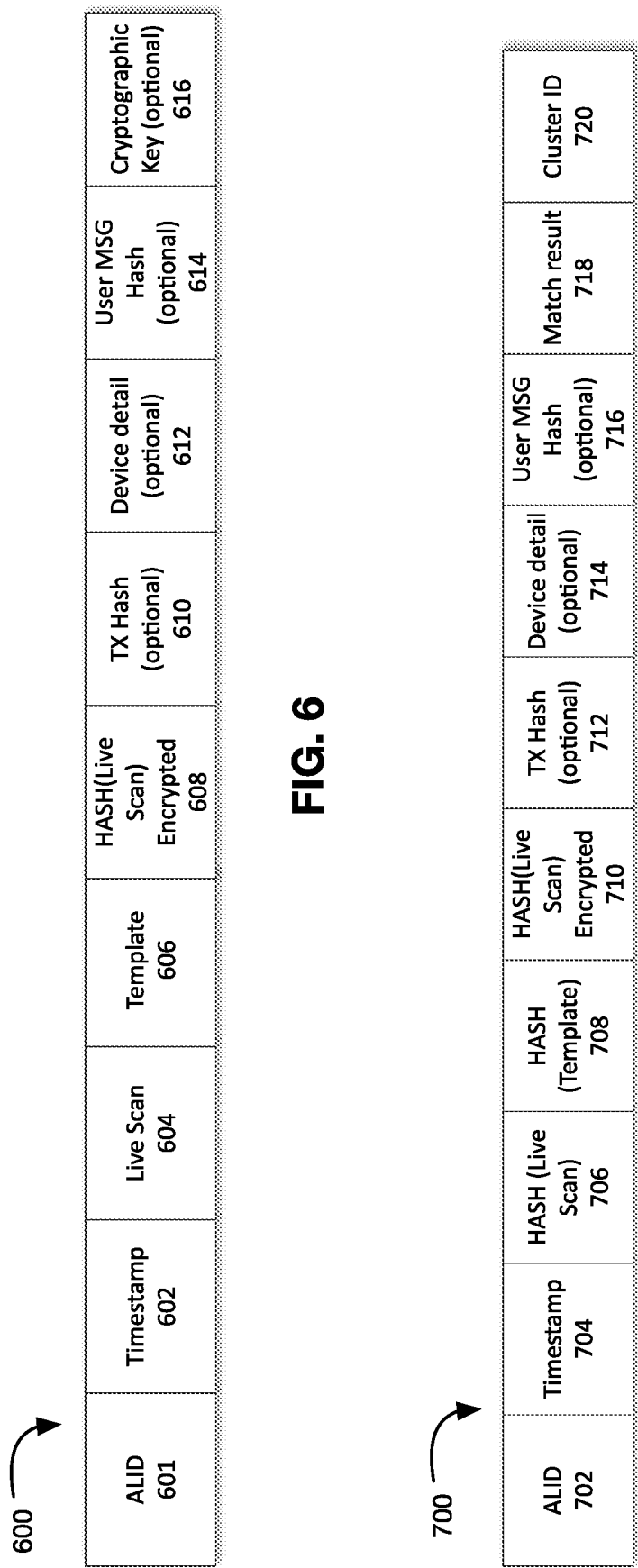

DECENTRALIZED BIOMETRIC AUTHENTICATION PLATFORM

TECHNICAL FIELD

The present disclosure relates in general to biometric authentication, and in particular to a decentralized platform for biometric authentication.

BACKGROUND

Biometric authentication is increasingly utilized as a mechanism for confirming an individual's identity in connection with varying types of transactions. For example, in recent years, smartphones have begun utilizing fingerprint sensors and/or facial recognition as biometric means of authenticating a user for, e.g., access to a device, access to confidential information stored within a device, or authorization of a transaction such as a purchase transaction.

However, conventional frameworks for biometric authentication may have numerous limitations. For example, typically, at least one entity involved in an authentication transaction must be a trusted party. Such platforms may be more vulnerable to code hacking, and suffer from a lack of auditability thus impairing trustworthiness. Matching biometric samples with templates is typically performed on a centralized server which lacks transparency and is prone to machine failure and adversary attacks. Biometric templates used for authentication and matching results are typically not recorded in immutable form, and therefore are of limited value in proving authenticity if a dispute arises. While biometric templates may be sensitive personal information belonging to their owners, in many biometric systems, users do not have authority to control access to their own biometric templates, including removal of access for stolen templates and template replacement.

For these and other reasons, the challenge of providing a scalable platform for biometric authentication with little or no centralization or trust requirement has been largely unmet.

SUMMARY

In accordance with some aspects described herein, a biometric authentication platform may use fault-tolerant distributed computing to determine if a supplied biometric sample and a sample stored in a registry are from the same person. Collection of reference samples is maintained in a distributed user ledger that may provide immutable history of modifications. Results of matching are stored in a separate distributed authentication ledger that may also provide an immutable history log. Coordinated use of both ledgers allows biometric authentication of registered users in real time. An immutable history log serves as a proof of authenticity and non-repudiation for external transactions that triggered biometric authentication by the platform.

In some embodiments, biometric authentication confirms the identity of an individual to validate a transaction with another entity. This other entity can be a person or a business such as a bank or hospital. The to-be-verified individual may be referred to herein as a User, and the other entity may be referred to as a Provider.

To register with the platform, a User may capture a biometric sample and upload it to the user ledger, such as via a transaction director. At authentication time, the User captures another biometric sample and sends it (e.g. via the transaction director) for matching with the previously recorded sample. The sample captured during registration may be referred to as a Template, and the sample captured during authentication may be referred to as a Live Scan.

A biometric authentication platform may be built on top of two independent distributed ledgers. One ledger is used to store Templates along with related user-specific data. This ledger is referred to herein as UL for "user ledger". The second ledger can be used to store authentication transaction records. Each time the platform receives a request to biometrically authenticate a registered user, biometric matching of Live Scan to Template may be carried out and the outcome may be saved as a transaction record in this ledger. This matching process is referred to herein as Authentication and the ledger may be called AL for "authentication ledger".

In some embodiments, with the exception of new User registrations, all requests handled by the platform may involve both ledgers. Processing flow sequencing is orchestrated by the transaction director or TD for short. Apart from coordination and sequencing of steps executed on UL and AL, TD software module also serves as a gateway connecting both ledgers to the outside world.

The AL and UL are logical representations. They can be implemented using the same physical networks or two physical networks that are completely separate from one another, by sharing nodes, or one network may be contained within the other.

Each ledger is preferably maintained by a network of interconnected nodes. Each of the AL nodes maintains a local copy of the entire AL. Each of the UL nodes also maintains a copy of the entire UL. Some of the transactions on the UL require access to the logs stored in the AL. This access is provided by either collocation of a pair of UL and AL nodes (e.g. attached to a transaction director) or by a network bridge between them.

These and other aspects of the systems and methods described herein will become apparent in light of the further description provided herein.

BRIEF DESCRIPTION OF THE DRAWINGS

FIG. 2 is a user record diagram.

FIG. 3 is a UL record with provider account attributes.

FIG. 4 is a set of Trusted List attributes.

FIG. 6 is a user authentication request.

FIG. 7 is an authentication ledger record.

DETAILED DESCRIPTION OF THE DRAWINGS

Figure 1:
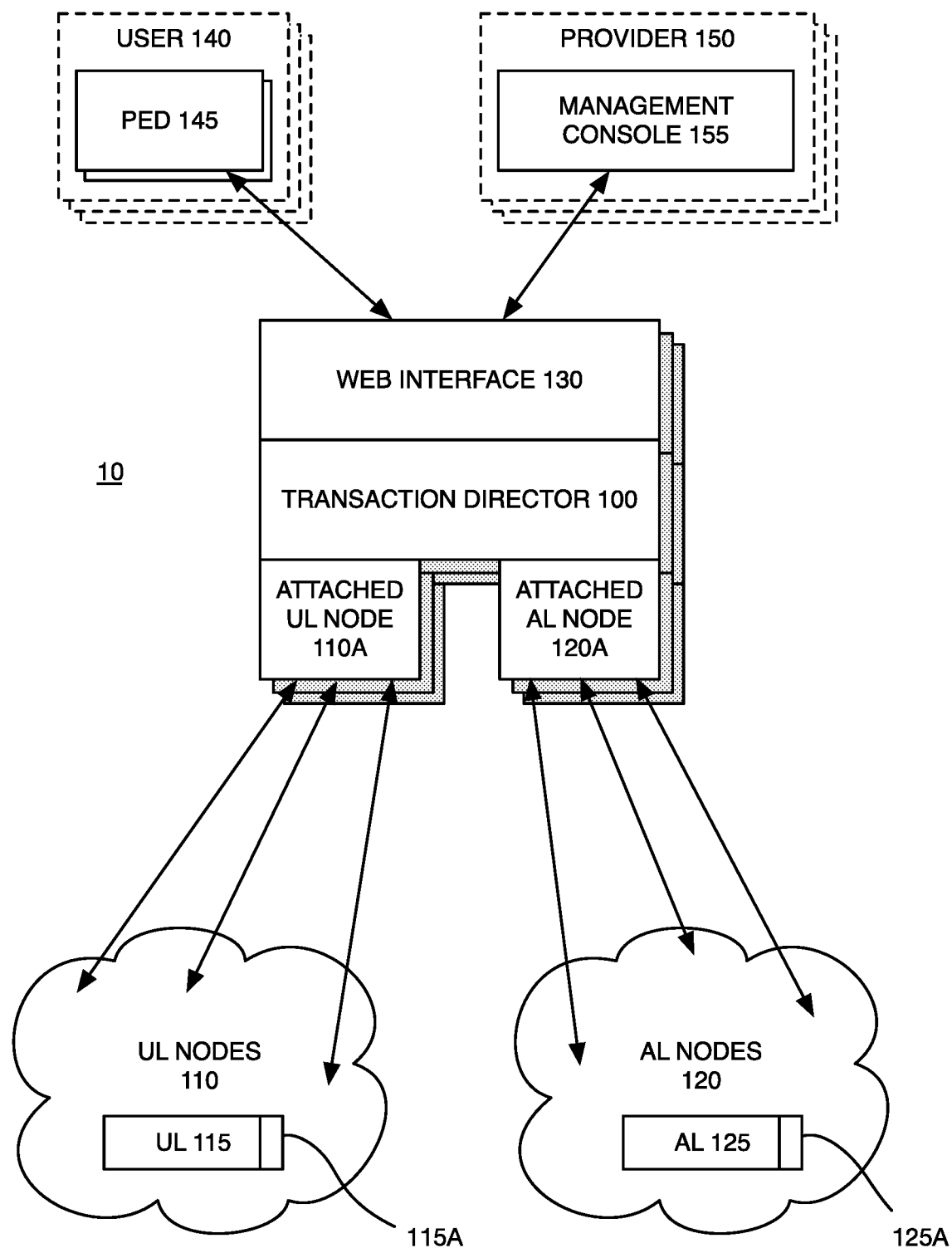
FIG. 1 is schematic block diagram of a platform for biometric authentication.

While this invention is susceptible to embodiment in many different forms, there are shown in the drawings and will be described in detail herein several specific embodiments, with the understanding that the present disclosure is to be considered as an exemplification of the principles of the invention to enable any person skilled in the art to make and use the invention, and is not intended to limit the invention to the embodiments illustrated.

Systems and methods are described which may include one or more characteristics that are highly beneficial for usability and market adoption of a biometric authentication platform. Such a platform will preferably have high availability, with the ability to maintain a high throughput regardless of total transaction volume. For example, maximum throughput may be limited wholly or primarily by total processing power available within a computing network. Network size may be dynamically adjusted to maintain consistent responsiveness. Such a platform is also preferably fault tolerant and designed to withstand multiple concurrent node failures. In some embodiments, a level of fault tolerance may be controlled in a network configuration.

Embodiments are also preferably wholly or highly decentralized and without a single point of failure. Such a platform may be deployed in a trustless environment without a governing body or any other authority participant. Platforms may be architected to assure data integrity and ease of auditing, by maintaining an immutable log of transactions. For biometric authentication, this enables the use of transaction records as a proof of authenticity. For a user registry, this facilitates data provenance inquiries and record history tracking. Platforms described herein may also protect confidentiality of biometric data, leveraging encryption and programmatically enforcing controlled data access. Such platforms may also be highly configurable and support installations ranging from a globally accessible public network, to a high-security isolated environment on a smaller scale.

FIG. 1 is a schematic block diagram illustrating a platform 10 for biometric authentication, in accordance with a first embodiment. The authentication platform 10 includes transaction director (TD) 100, UL node network 110 implementing distributed User Ledger ("UL") 115, and AL node network 120 implementing distributed Authentication Ledger ("AL") 125. As described further hereinbelow, UL 115 may further run one or more smart contracts 115A; AL 125 may run one or more biometric matching algorithms 125A to reach decentralized consensus. TD 100 includes, or is attached to (e.g. functionally, logically, or via physical or equipment collocation) at least one node from each of node networks 110 and 120 (i.e. attached UL node 110A and attached AL node 120A). TD 100 further includes or interacts with web interface 130. Web interface 130 provides a programmatic mechanism for network-based interactions between TD 100 and: a personal electronic device (PED) 145 utilized by User 140; and management console 155 associated with Provider 150.

In many embodiments, a user may use one or more trusted personal electronic devices 145 in order to interact with the transaction director or provider. Modern personal electronic devices may be particularly convenient, having fingerprint scanning or advanced imaging capabilities that may be utilized for capturing biometric samples. However, while the user device is illustrated in the embodiment of FIG. 1 as a personal electronic device, a User's registered device need not be so limited. It is contemplated and understood that a user 140 may utilize any computing device capable of network communications and interaction with the user, in place of PED 145. For example, a bank may require a customer (acting as a User) to authenticate himself or herself on site at the bank's premises using a computing device owned by the bank, such as an ATM machine. In such a use case, the device private key can be stored in a private database maintained by the bank and transferred to the ATM or computing device through its internal network during authentication. Similarly, it is understood that Provider management console 155 may be implemented using any of a variety of network-enabled computing devices.

In general, requests handled by biometric authentication platform 10 may be divided into two broad categories. Transactions resulting in the changed state of the UL 115 fall into a first category. New user registration, appending some relevant data fields to an already existing user record, disabling a record, etc. are all examples of such transactions. Transactions of this kind are typically not time critical by nature and can take seconds to execute without having a detrimental effect on the user experience. Transactions of a second category are Authentications logged in AL 125. These transactions typically require low latency and may be essential to the perceived responsiveness and overall usability of the platform.

Updates of UL 115 modify User records and should be authorized. This authorization should be carried out prior to execution of any ledger-changing transactions, other than new user registrations. A process of authorization can involve Template retrieval followed by Authentication. Upon successful Authentication, a UL 115-modifying transaction may be authorized and allowed to proceed.

The Transaction Director

One or more transaction directors may be included in embodiments of a system for biometric authentication. A transaction director ("TD") can play two roles: (1) the TD acts as a gateway, allowing Users 140 and Providers 150 to access data content and request services from UL 115 and AL 125; and (2) the TD coordinates step-by-step execution of requests received from Users 140 and Providers 150.

Thus, TD 100 implements a thin gateway for interactions amongst UL 115, AL 125, User 140 and Provider 150. As a gateway, TD 100 exposes APIs that can be called by client software such as a Web server, business-layer custom components, or the like.

As a transaction coordinator, TD 100 receives requests originated by Providers 150 or Users 140, and handles them following prescribed execution paths, including validation steps, UL queries, UL smart contract invocations, and Authentication Protocol invocations on AL 125.

While TD 100 may be considered centralized in terms of managing messages amongst other resources, TD 100 does not itself affect the authenticity of records stored in the UL 115 and AL 125, because UL 115 and AL 125 are only updated when consensus is made over a decentralized network (e.g. amongst UL nodes 110 and AL nodes 120, respectively). Further, in some embodiments, multiple instances of TD 100 may be implemented, each with attached UL and AL nodes, and preferably having an associated web interface 130. If, for example, a particular TD 100 is untrusted or a transaction party wishes to verify a TD's operation, a User 140 and Provider 150 can read back transaction records from a different TD (or multiple different TDs) immediately after a transaction occurs, in order to verify the transaction. Additionally or alternatively, a transaction participant may audit transaction records (and/or audit TD operation) at any time after a transaction is completed, by reading back transaction data from one or more TDs other than the one via which the transaction was orchestrated.

Attached UL node 110A maintains a copy of the UL 115 locally for TD 100. Similarly, attached AL node 120A maintains a copy of AL 125 locally for TD 100. Despite the fact that TD 100 has access to both ledgers via attached nodes 110A and 120A, TD 100 is incapable of directly modifying contents of either one of them.

TD 100 preferably need not implement business logic, but is rather stateless. TD 100 need not keep track of the state of the external protocols it is executing. Intermediate protocol-state-specific data used in some scenarios may be stored inside the affected UL record. This way, a large number of Users 140 and Providers 150 can interact via multiple instances of TD 100 concurrently, even when they are connected to the same UL 115 and AL 125. Handling of incoming service requests to TD 100 may be accomplished, and audited, in real time.

In general, TD 100 can orchestrate the following sequence of steps:

(1) Template retrieval. TD 100 requests a template from the local UL node 110A and gets an immediate response.

(2) Authentication of Template against Live Scan. TD 100 sends a Template and Live Scan to one or more Processor servers amongst AL nodes 120 (preferably Processor servers optimized for biometric matching). The Processor servers produce a result, returning it to TD 100. The Processor servers also add a record of the transaction to the AL 125. The duration of this step two hinges on the performance of these specialized servers.

(3) Execution of a transaction modifying UL 115 upon successful authorization in step (2). Execution of this transaction may be accomplished using a standard path of a smart contract. The transaction may be executed and validated in parallel on multiple instances within AL nodes 120. Process of validation may include a step where prior authorization from step (2) has to be verified. This verification is a query by a UL validating node 110 into the AL 125. This query can only produce a result after the AL 125 addition from step (2) has had enough time to propagate through the network of AL nodes 120. Once this happens and the query returns a result, smart contract processing can proceed, affecting the UL change that is eventually replicated across the entire network of UL nodes 110.

Operations within step (3) may take more time than those of steps (1) and (2). But, as it was stated earlier, transactions that include step (3) are typically not time critical. The significant majority of requests expected to be handled by the platform, in some embodiments, are initiated by Providers needing to confirm a User's identity. Such requests generate new AL records but do not affect the UL and, therefore, may be processed in steps (1) and (2) above, but need not proceed to step (3), whereby the platform may be capable of meeting high throughput requirements.

The User Ledger (UL)

User ledger (UL) 115 is a collection of user records. Each record corresponds to a registered User and stores a User's Template. UL 115 is preferably implemented using Distributed Ledger Technology. UL 115 is hosted on a network of interconnected computing devices, namely, UL nodes 110. Each node 110 preferably stores an identical copy of UL 115. UL 115 preferably leverages a number of key properties offered by the underlying technology, such as: byzantine fault tolerance; modifications to UL 115 are controlled by a distributed consensus protocol; UL 115 is decentralized (no central authority) except scenarios when it's deployed on a private network controlled by a single entity; UL 115 maintains an immutable history log, such that it is always possible to audit UL 115 and recreate its earlier state all the way back to UL's genesis; and all user data stored in the ledger is either encrypted or hashed, with the template possibly being scrambled using techniques described further hereinbelow.

The state of UL 115 is modified by submitting transactions to smart contracts executing on the ledger. History of transactions is persisted in the immutable log. Every time the state of UL 115 changes, it has to propagate through the entire network of nodes 110 storing a full replica of the ledger. This step causes latency. On the other hand, when client software, such as TD 100, reads data from UL 115, this process runs locally on a node 110A handling the request and may thus be executed with minimal latency.

FIG. 2 illustrates a typical ledger structure that may be utilized when a new User record is added to UL 115. The first field 200 is ULID—a unique identifier assigned to the record. This identifier may be a hash of a human-readable text supplied by the user. By default, users are preferably prompted to use their e-mail address but the system may accept any alphanumeric string as long as it results in a unique hash. The second field 210 is Template from the biometric sample supplied by User at registration. The contents of the first two fields may be fixed and never change after record creation.

The third field 220 reflects a current state of the user registration. Initially it is set to "ACTIVE", but it can also be set to "DISABLED" or "RECOVERY". In addition to the status setting this field may also contain some service information when a record is in RECOVERY. When status is set to ACTIVE, a service information portion of the field 220 may be empty.

The fourth field 230 is a nonce. Initially, it's set to zero. Every time a state of the record is changed by a smart contract, this field 230 is preferably incremented. The purpose of field 230 is to protect UL 115 from replay attacks.

The fifth field 240 contains information about the device used at registration. Other than new user registration, to be able to interact with UL 115, users must use one of their previously-registered devices. Registered devices can be mobile devices (such as a smartphone or tablet), or other electronic devices owned by the user. In some embodiments, a User may also utilize a shared device, or even a public terminal such as a bank automated teller machine (ATM), as a registered device, as long as the User trusts that device to be safe for storing private data including cryptographic keys used by the platform.

The fifth field 240 is an example of a UL record attribute. Even though a UL record must have at least one registered device attribute, any number of additional attributes can be appended to a record. More generally, three types of attributes may be attached to a record within UL 115: Registered Device, Provider Account, and Trusted List.

FIG. 3 illustrates an exemplary set of UL record attributes with two Registered Devices and three Provider Accounts. (UL record ULID, Template, Status and Nonce fields are not shown in FIG. 3.)

A Registered Device attribute to a record within UL 115 (such as Attributes 300A and 300B in FIG. 3) may store information about devices that are authorized to produce Live Scans. A Registered Device attribute may consist of two fields: (1) a hash 302A-B of a hardware identifier for the device, such as an IMEI (which field may also be referred to as a Device ID); and (2) a public key 304A-B corresponding to the private key stored locally on a device referred to as PuK-Dev (described further below).

A Provider Account attribute stores information authorizing and enabling secure transactions between a User and particular Providers. Exemplary Provider Account attributes 310A, 310B and 310C are illustrated in FIG. 3. The User has registered three Providers: "Gold Gym acct #123" (associated with Provider Attribute 310A), "Loyalty Program acct #456" (associated with Provider Attribute 310B), "Chase Bank checking" (associated with Provider Attribute 310C). Chase Bank is "Trusted" (as indicated in field 312C) meaning that it is authorized to be used in a record access recovery protocol. Each Provider stores its private key (PrK-Prov1, PrK-Prov2 and PrK-Prov3) in an external database maintained by the respective Provider.

The Provider Account attribute may be constructed using a cryptographic public/private key pair. The Private Key is typically stored in a database maintained by a Provider associated with the attribute, and is never shared on UL 115.

In practice, a Provider Account Attribute such as attribute 310A may include four fields: a Provider ID 311, a Trusted Flag 312, encrypted account information 313, and a Public Key Translation Table 314. A Provider ID 311 may be formed from a hash of a public key for the Provider associated with the Attribute. Preferably, Provider IDs only exist in the context of a single User record, i.e., the same Provider will have different IDs for different Users. The Trusted flag 312 may be set to YES to indicate authorization for the Provider associated with the Provider Account Attribute to assist the User associated with the UL entry to assist in recovery of a UL record. Recovery procedures would typically be used when a User loses access to or control of all registered devices associated with a UL record. The encrypted account information field 313 is a description of the provider and/or of the account in free format. Text contents within encrypted account information field 313 is preferably encrypted using the Provider private key.

Public Key Translation Table 314 provides a cryptographic link enabling Registered Devices and Trusted Providers to recover a public key for a user, without storing the user's public key openly in UL 115. In particular, each Provider maintains a unique public key associated by the Provider with a specific User. This unique, user-specific public key may be referred to as PuK-ULID. PuK-ULID can be used to decrypt identifiable information about the Provider with which it is associated. To preserve confidentiality, the PuK-ULID is not openly stored in UL 115. Instead, PuK-ULID is preferably encrypted using a PuK-Dev associated with a registered device. Thus, a table row within Public Key Translation Table 314 for Provider 1 (i.e. Provider Attribute 310A) may contain a key-value pair of: Device 1 ID: $E_{PuK\_Dev1}$ (PuK-Prov1); where the key is the ID of Device 1, and the value is the public key of Provider 1 encrypted with the public key of Device 1. To reverse this double encryption of user public key PuK-ULID, a Registered Device or Trusted Provider looks up its associated entry in translation table 314, retrieves the encrypted public key, and decrypts the user's PuK-ULID using its own local private key.

Since each registered device has its own PuK-Dev, multiple encrypted PuK-ULIDs are stored in a UL record; one for each registered device. Thus, in the example of FIG. 3, the User has registered two devices identified by hashes of their respective IMEIs: Device 1 ID and Device 2 ID. Private keys (PrK-Dev1, PrK-Dev2) are stored on the devices. Their respective public keys (PuK-Dev1 and PuK-Dev2) are stored in the second field of the attributes.

Trusted List Attribute

FIG. 4 illustrates Trusted List attributes 400A and 400B. Trusted List attributes 400A, 400B may be appended to a UL record and used in a Trusted Circle record recovery protocol as an alternative to recovery with the help of a Trusted Provider. Trusted List refers to a variable length list of users (Trustees) who can participate in a voting process to confirm identity of a User who lost all registered devices. There may be multiple Trusted Lists in one UL record (e.g. lists associated with attributes 400A and 400B, in the embodiment of FIG. 4). The same Trustee may appear in multiple Trusted Lists of a single UL record.

A Trusted List attribute 400 may be configured using a Registered Device (e.g. Device 1 associated with UL record field 300A and Device 2 associated with UL record field 300B). The Trusted List attribute 400 contains four fields: (1) a unique List ID 401, which may be automatically generated when the List attribute is created, as a hash of the data object with three fields (e.g. ULID, Device ID, hash of the list of trustee IDs); (2) an array of key-value pairs 402, with one pair per each Registered Device; the key is set to a Registered Device ID and the value is a description of the Trusted List encrypted with the device public key; (3) a minimum number of required votes 403; preferably, the User can set this number to be less than or equal to the total number of Trustees in the list; and (4) a List of Trustees 404. The List of Trustees 404 is a variable length array of key-value pairs. The key is a ULID of a Trustee. The value is Trustee's status. When a Trustee is first added to a Trustee List, the status is set to PENDING. After a Trustee confirms his or her participation, the Trustee's status changes to CONFIRMED. When a record recovery is in progress and Trustee responds with a vote, the Trustee's status changes to VOTED. Thus, for example, Trusted List attribute 400A is associated with two registered devices 402, has a list description of "Family members", requires at least two votes for recovery (specified in field 403), and includes a list of three Trustees in total ($ULID_{MOM}$, $ULID_{DAD}$, $ULID_{Mary}$). Trusted List attribute 400B is also associated with the user's two registered devices, has a list description of "Coworkers", requires at least four votes for recovery, and includes a list of four Trustees in total.

The Authentication Ledger

Figure 5:
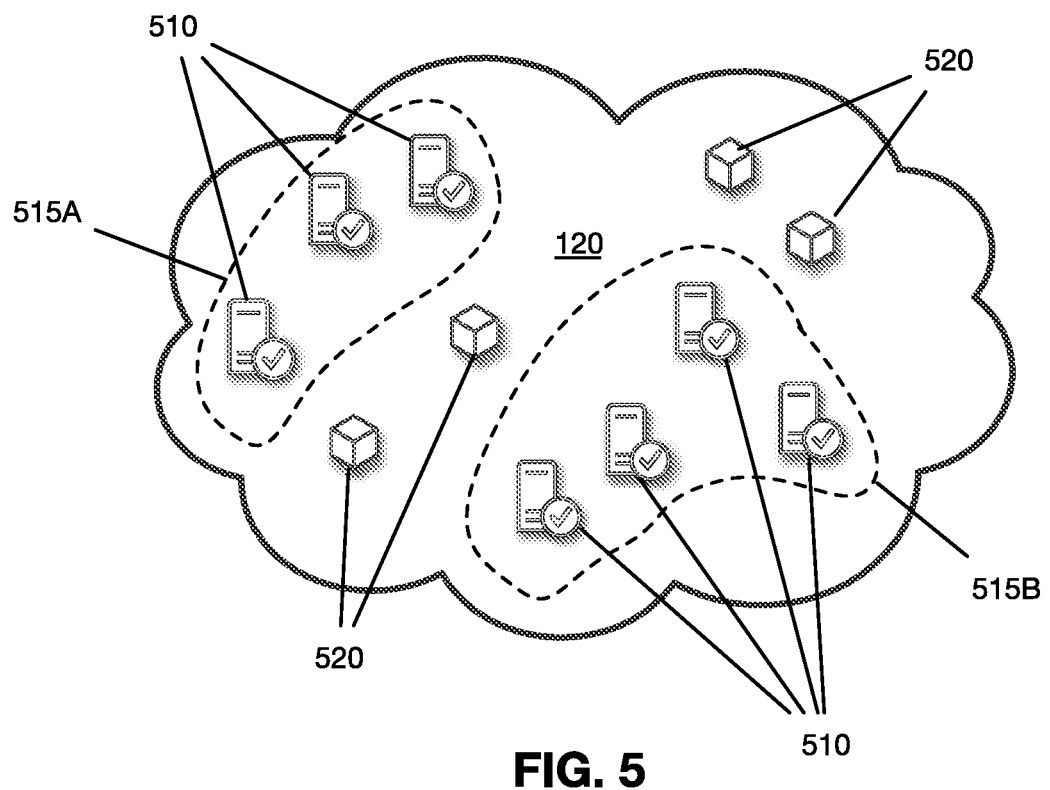
FIG. 5 is a schematic block diagram of an AL node network with multiple processing clusters.

Authentication Ledger is a collection of records that stores details of processed User Authentication requests. FIG. 5 provides a schematic block diagram illustrating AL nodes 120, implementing AL 125.

AL 125 is implemented using Distributed Ledger Technology. It is hosted on a network 120 of interconnected computing devices called nodes. Nodes 520 host AL 125 and interact with one another, and will Processors 510, to maintain AL 125. Processors 510 are nodes that also host specialized software responsible for the execution of biometric matching processing algorithms. Latency of Authentication request execution typically depends on the efficiency with which Processors 510 handle their computational tasks. Processors 510 should be implemented on hardware that is optimized for and capable of the biometric matching computations for which they will be used. In addition to processing Authentication requests, Processors 510 are responsible for storing the full logs of Authentication requests processed by them.

Some characteristics of AL 125 are defined by the selection of the underlying Distributed Ledger Technology platform and its configuration. For example, preferably AL 125 is: crash-fault-tolerant, unless installed on an insecure network where it may be byzantine-fault-tolerant; decentralized (no central authority) except scenarios where it's deployed on a private network controlled by a single entity; scalable to maintain required throughput; and immutable. Other preferred characteristics and benefits are domain-specific, for example: AL 125 maintains low latency using optimized hardware for biometric matching; and AL 125 supports real time audits. The size of AL 125 is optimized and transaction privacy is improved through the use of external storage for biometric data; to preserve auditability, AL 125 records store hashes of biometric data. Full logs of processed User Authentication requests are preferably stored externally. Further, AL 125 supports full biometric privacy mode where externally stored logs are encrypted.

FIG. 6 illustrates an exemplary User Authentication request 600 that may be transmitting by a TD 100 and implemented by AL nodes 120. ALID 601 is used as a record identifier in AL 125, and is determined (preferably computationally) by the instance of TD 100 that is submitting the request 600. TD 100 uses an appropriate technique for the calculation, to ensure a unique ALID for each transaction. For example, for a User Authentication request originated by a Provider 150, ALID 601 may be computed by hashing a data object comprising: a User ID (ULID), transaction information such as a hash of transaction data supplied by a Provider 150 (e.g. TX hash 610), and a Provider ID (such as a hash of a public key assigned to a User 140 by Provider 150 at Registration). For other types of requests, an ALID may be computed by hashing a data object with: ULID, Device ID (such as a hash of a hardware identifier associated with a device used in the request), and a nonce (i.e. a field of the User record that gets incremented each time the record is updated).

Timestamp 602 is obtained by TD 100 from its local environment and supplied with the request 600.

Live Scan 604 is supplied by the User 140 associated with request 600. As explained elsewhere herein, Live Scan 604 contains current biometric data from User 140, for which a comparison is requested with a User's Template. Template 606 specifies biometric information with which Live Scan 604 is to be compared. As described elsewhere herein, Template 606 may be retrieved from UL 115 by Transaction Director 110.

Encrypted HASH(Live Scan) 608 is supplied by the User 140, and may be used to verify the authenticity of Live Scan 604 during auditing. In particular, it may be decrypted by using a public key of one of the User's devices (PuK-Dev), and should equal the unencrypted hash of Live Scan data that is stored within the AL record, thus verifying, e.g., that the processed Live Scan was not switched with fake biometric data en route from the User device 145 to AL Processors 510.

TX Hash 610 provides a hash of Transaction details supplied by the Provider 150 that requested Authentication of User 140. The source of hash 610 may be a detailed record of a transaction between a Provider 150 and a User 140.

Device details 612 provides details descriptive of a device used by User 140 to produce or transmit Live Scan 604. For example, a User 140 may respond to an authentication request with a Live Scan, whether procured directly by a user PED 145 (e.g. a fingerprint scan, palm print scan or facial recognition data procured by sensors within PED 145), or procured by another source and transmitted by PED 145. When a User 140 responds to an authentication request with a Live Scan, software on User PED 145 may include encrypted detailed information retrieved from device, potentially via a device operating system (e.g. geo-location, SIM card information, IMEI, and the like) (subject to regulations and user privacy considerations), which information may be conveyed from PED 145 to transaction director 100 via, e.g., web interface 130. This field may be used when the Provider 150 that requested User Authentication requires such details to, e.g., confirm information about or impose constraints or requirements on the Live Scan source. The data within the device details 612 field may be encrypted with the requesting Provider's public key to avoid openly storing potentially private information concerning User 140 on a distributed ledger. Nonetheless, inclusion of transaction hash 610 and device details 612 in a record within AL 125 enables AL 125 records to be used as a proof of authenticity and non-repudiation for external transactions.

User MSG Hash 614 optionally includes a hash of the text message sent to the User 140 with a description of or reason for the requested authentication. The message is sent from Provider 150 and displayed to the User 140 in connection with agreement of User 140 to the requested biometric authentication. By performing biometric authentication, the User 140 authorizes a transaction described in the message. After the transaction, the full message is stored locally by User 140 and Provider 150, with MSG Hash 614 stored directly in AL 125. In a future audit event, one or both sides can present the full message and the User MSG HASH 614 can be retrieved from AL 125 and used to prove the authenticity of the presented message.

Cryptographic key 616 is optional, and includes a cryptographic key that may be used to encrypt the full biometric samples (Live Scan 604 and Template 606) supplied with the request 600, when stored locally by Processors 510. When this feature is used, future audit will only be possible by a party holding a key that's needed for decryption.

FIG. 7 illustrates a format for an AL record 70 stored within AL 125. ALID 702 is supplied with a request 600 in field 601. Timestamp 704 is supplied with a request 600 in field 602. Hash (Live Scan) 706 and Hash (Template) 708 are hashes of biometric samples supplied with the request 600. Encrypted HASH (Live Scan) 710 is supplied with the request 600 in field 608. TX Hash 712, device details 714 and User MSG Hash 716 are also supplied in the request 600 in fields 610, 612 and 614, respectively.

Field 718 contains the match outcome, which in some embodiments may be expressed as a yes/no result. Cluster ID field 720 contains an identifier for a processing cluster utilized to perform the matching operation yielding the result of field 718. This ID 720 can be used during audits for locating the original Authentication request record with full copies of Template and Live Scan (since that data is preferably stored locally by the Processor 520 performing the matching operation).

Handling of Authentication Requests

Each Authentication request is handled by a group of Processors 510, which may be referred to as a Processing Cluster. For example, in the embodiment of FIG. 5, AL nodes 120 include processing cluster 515A having three Processors 510, and processing cluster 515B having four Processors 510. In actual practice, processors 510 may be allocated to processing clusters with an objective of achieving fault-tolerant operation. AL 125 is built on transaction-level consensus. Processors 510 within a single Processing Cluster 515A, 515B receive an Authentication request, process it and agree on the Authentication outcome. This decision is final and is saved in the AL 125. If for some reason Processors 510 within a Processing Cluster 515 are unable to reach consensus (e.g. a majority of the Processors 510 within a Cluster 515 fail and/or lose connectivity), the Processing Cluster 515 returns a failure result to the requestor, but wrong Authentication outcome never gets written into AL 125.

AL nodes 120 can be set up in different environments in terms of security. The most critical components of AL nodes 120, the Processors 510, may be hosted in a tightly controlled secure environment where a main concern would be an intermittent connectivity loss or some other hardware failure rather than Processors 510 being hacked in such a manner as to control majority voting and produce false results. In this environment, Processing Clusters 515A, 515B can be configured to use one of the Crash-Fault-Tolerant distributed consensus algorithms that offer better performance and smaller Cluster size compared to the Byzantine Fault Tolerant family of protocols. The latter are designed to deal with a public network that is likely to contain misbehaving nodes, and therefore will require more Processors 510 in the Cluster 515 and will thus typically be slower to reach a consensus.

Additional methods and configurations may be used in setups where Processors 510 operate in a less secure environment. Reliability of results can be improved by using security auditing software that feeds preprocessed Template-Live Scan pairs to the Processors 510 and compares the generated results with pre-calculated values as described elsewhere herein.

Another way of monitoring security is by setting up a monitoring station that selectively intercepts incoming Template-Live Scan pairs, processes them locally, and compares the result with the one produced by a Processing Cluster 515A, 515B to which the comparison is assigned.

Processing Clusters 515 may be virtual groupings in a sense that Cluster members 510 do not necessarily need to share the same hosting facility: physical or cloud. AL 125 is preferably designed for scalability. Whenever a lack of processing capacity becomes a performance issue, more processors 510 may be added to AL nodes 120 in order to address the problem. Processing Clusters 515 can be formed dynamically for load-balancing optimization. Distributed Processing Cluster colocation may also be used to improve decentralization and eliminate a central hosting authority that might otherwise be effectively imposed on AL 125 if processors 510 were collocated in a single hosting facility or commonly-controlled hosting facilities.

Except for failed consensus situations on the cluster level, each User Authentication request results in a record added to AL 125. To facilitate audits, it may be necessary to store biometric data used by the Authentication request so that authentication matching results can be reproduced. However, some types of biometric data that may be desirable for use in authentication may involve significant volumes of data. Moreover, while each of AL nodes 120 is expected to host a full replica of AL 125, many AL nodes 120 may not be powerful Processor stations 510, such that storing each transaction's biometric data within the distributed ledger may impose significant storage burdens. To reduce required storage capacity for AL nodes 120, in some embodiments, each AL record will only include the hash of the processed request, as described above. A full copy of the request will preferably be stored by some or all of Processors 510 on a high-capacity fault tolerant storage media. This arrangement may significantly reduce the size of AL 125 while preserving its full auditability.

In some embodiments, AL 125 may support a full biometric privacy mode of operation. In this mode, externally stored logs of User Authentication requests are encrypted.

Transaction Director Request Handling

Requests handled by TD 100 may fall into at least two broad categories: (1) requests from Users 140; and (2) requests from Providers 150. Note that preferably, requests are always signed and the digital signatures of Users 140 and Providers 150 are verified by TD 100. For simplicity, the application and verification of digital signatures may not be explicitly listed in processes described hereinbelow.

Figure 8:
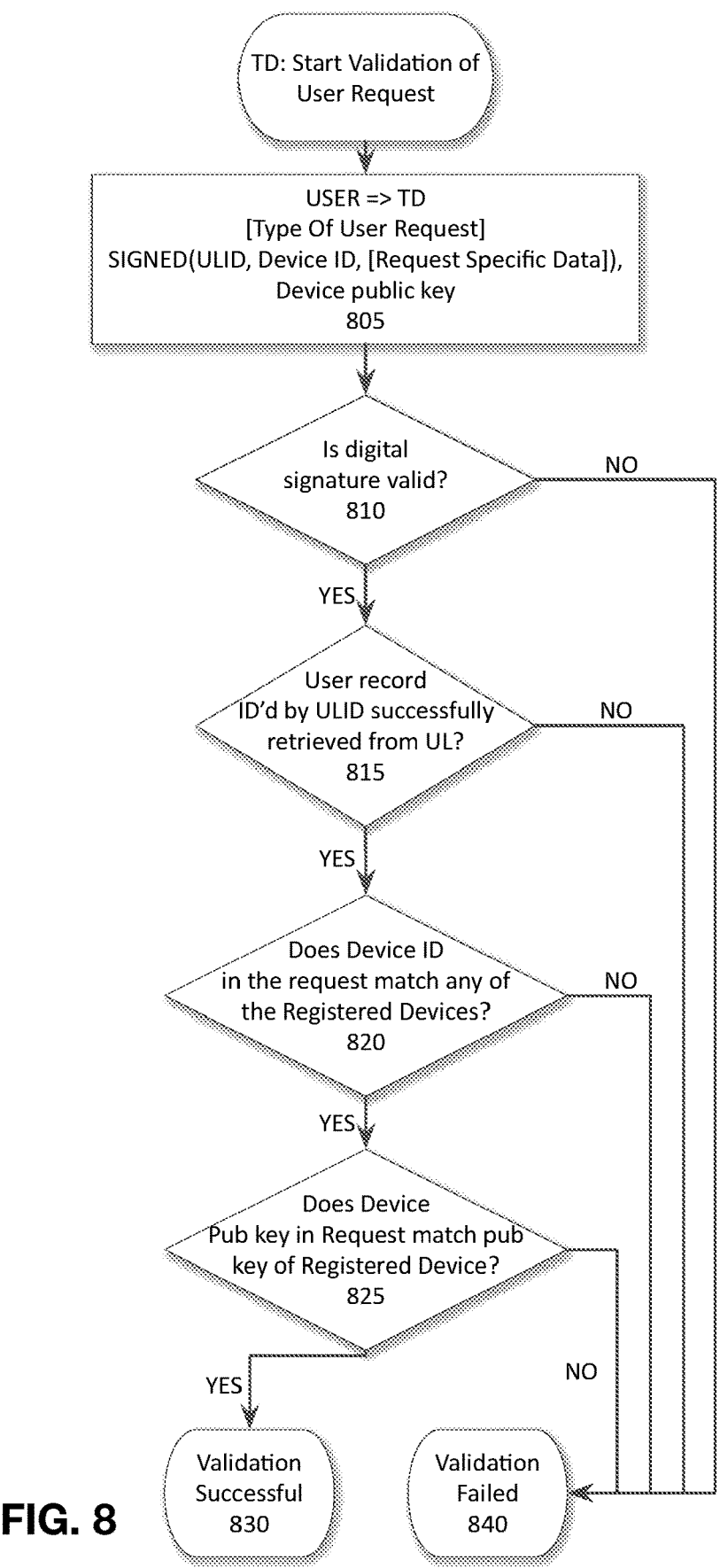
FIG. 8 is a process for validation of a user request.

FIG. 8 illustrates a method by which a transaction director may process a User request. This method may sometimes be referred to as Validation of a User Request. In step 805, a user 140 transmits a request to TD 100 via web interface 130. Request messages sent to TD 100 by a User 140 preferably include the following fields: User ID (UL record identifier ULID); Device ID (Hash of the hardware identifier of the device); and Request-specific data. The Request is signed by a User 140 with a private key stored locally on the user's device 145. A respective public key is attached to the message.

In step 810, TD 100 validates the digital signature applied to the Request. In step 815, TD 100 validates the User ID specified in the Request. Validation in step 815 succeeds if TD 100 is able to retrieve from UL 115 a copy of the User record identified by the ULID received in step 805. In step 820, TD 100 validates the requesting device 145 by finding the Device ID received in step 805 amongst Registered Devices in the User record retrieved in step 815. In step 825, TD 100 validates the public key supplied in step 805 by checking to confirm that it matches the public key of the Device ID in the User record retrieved in step 815. In any of the validations in steps 810, 815, 820 or 825 fails, then the overall User request is deemed to have failed (step 840). However, if the validations in steps 810, 815, 820 and 825 all succeed, then the overall validation effort is deemed successful (step 830).

In some scenarios, such as record recovery or new device validation, only one of steps 810-825 may be performed, with the remaining steps skipped.

Figure 13:
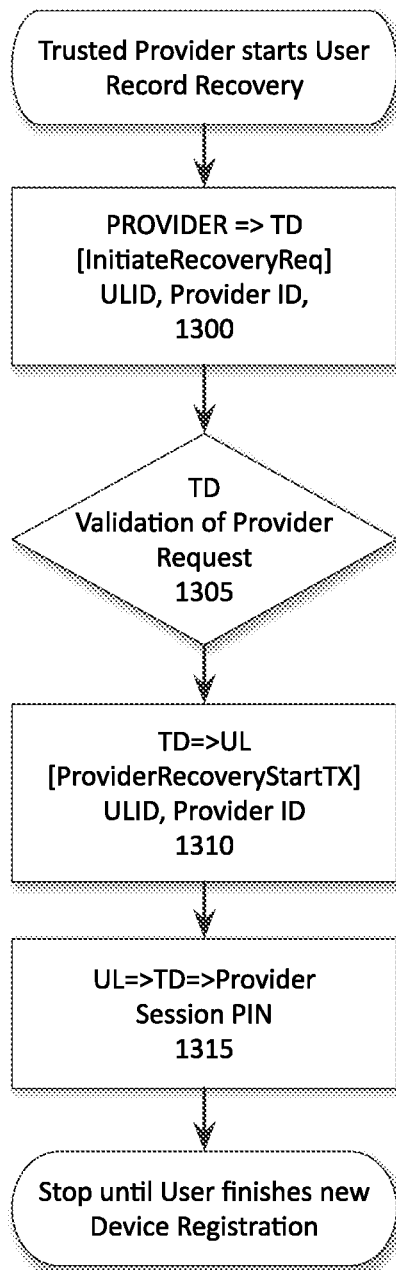
FIG. 13 is a process for trusted provider initiation of a user record recovery.
Figure 14:
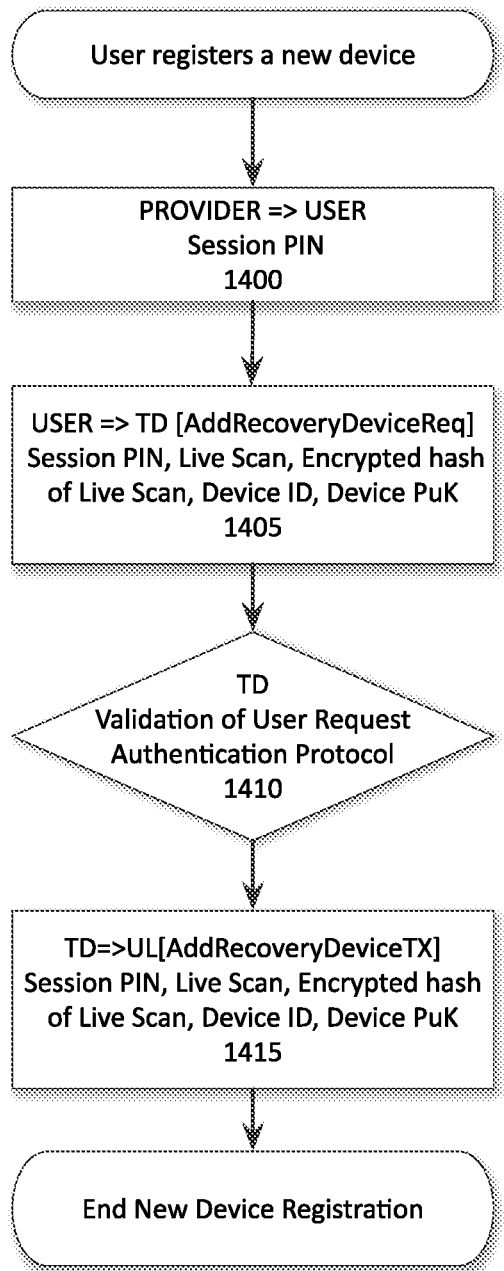
FIG. 14 is a process for user registration of a new device during trusted provider user record recovery.

In a Trusted Provider recovery, the ULID check in step 815 is replaced by a Recovery Session PIN check, as explained further in connection with FIGS. 13 and 14.

Figure 9:
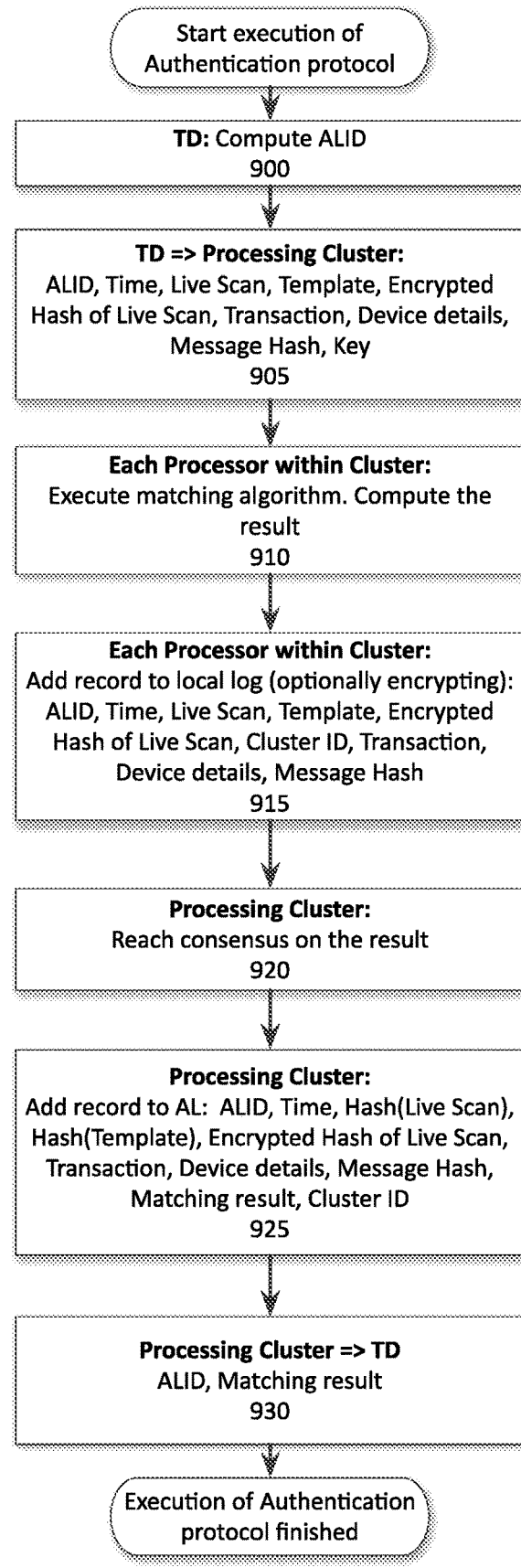
FIG. 9 is a process for an authentication protocol.

In the event that a User Request is successfully validated (step 830), TD 100 may continue processing, such as via execution of an Authentication Protocol. FIG. 9 illustrates an exemplary Authentication Protocol method.

In step 900, TD 100 computes an AL record ID ("ALID"), as described elsewhere herein. In step 905, TD 100 sends a request 600 to a Processing Cluster (515A, 515B). The content of the request of step 905 is illustrated and explained in connection with FIG. 6.

In step 910, each of the processors 510 within a processing cluster (e.g. 515A or 515B) executes a biometric matching algorithm on Template 606 and Live Scan 604, and computes a result. In some embodiments, the result is an affirmative or negative indication that the Live Scan matches the Template.

In step 915, each processor 510 within the selected processing cluster (515A, 515B) adds a record documenting the processed request 600, to a local log maintained by the processor. The record added in step 915 preferably includes complete copies of the Template and Live Scan used in generating the result computed in step 910. If request 600 contained a cryptographic key 616, cryptographic key 616 is used to encrypt the record prior to storage in step 915.

In step 920, processors 510 within the selected processing cluster (515A, 515B) seek to agree on a matching result, following rules prescribed by a consensus protocol governing the cluster.

In step 925, the processing cluster (515A, 515B) adds a record of the Authentication request 600 to AL 125. In the record 700 logged in AL 125, the live scan content is replaced by live scan hash 706, the template content is replaced by template hash 708, and cluster ID field 720 is added, as described further elsewhere herein.

In step 930, the processing cluster (515A, 515B) sends the ALID and matching or Authentication result to TD 100, reporting completion of the authentication protocol.

Subsequent actions by TD 100 depend on the nature of the User Authentication request. In a case where a User Authentication is requested by a Provider 150 that is transacting with a User 140, TD 100 in turn finishes processing and returns an ALID and matching result to the calling Provider 150. In other cases, TD 100 may proceed by calling a smart contract 115A on UL 115 supplying data present in the User Request. In other scenarios, TD 100 may proceed by sending notifications to User devices, or other actions as desired to utilize the authentication result returned in step 930.

Figure 10:
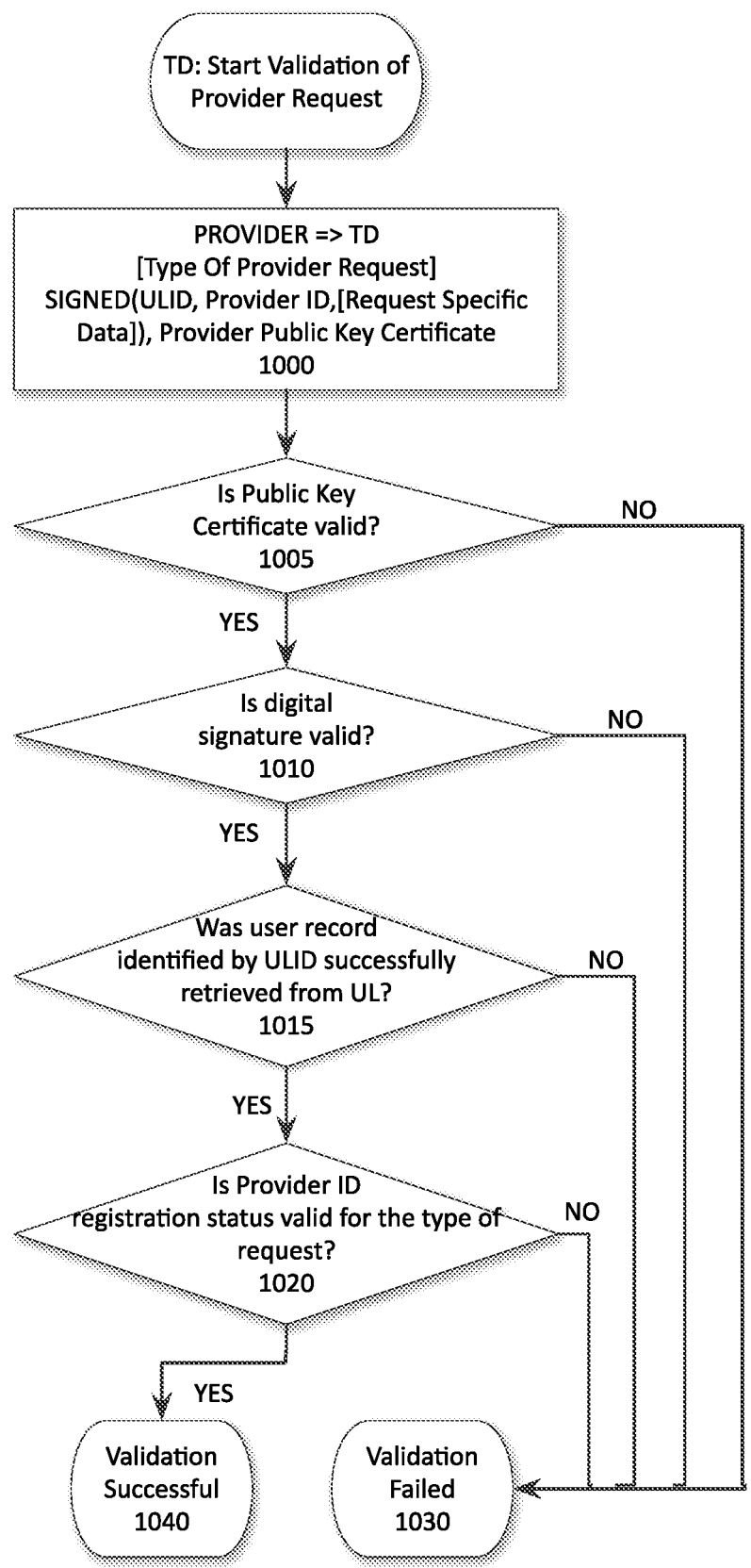
FIG. 10 is a process for validation of a provider request.

A transaction director may also process requests from Providers 150. FIG. 10 illustrates a process for handling a message or request from a provider 150. In step 1000, a Provider 150 transmits a Request to TD 100 via web interface 130. This request may contain the following fields: a ULID; a Provider ID (such as a hash of the public key that was assigned to a User 140 by a Provider 150 during Provider Registration); and request-specific data. Such a provider request may be signed with the private key held by the Provider 150. A corresponding public key certificate may be attached to the message.

In step 1005, TD 100 verifies the validity of the Public Key Certificate contained within the request of step 1000. In step 1010, TD 100 validates a digital signature applied to the Provider Request. In step 1015, TD 100 validates the ULID specified in the request of step 1000. Validation in step 1010 succeeds if TD 100 is able to retrieve a copy of the User record identified by the ULID within the Request from UL 115. In step 1020, TD 100 checks if the requesting Provider 150 has been authorized by the User 140 specified in the request. A Provider ID supplied with the request in step 1000 has to match one of the Provider IDs found in the User record (e.g., within a Provider attribute (310A, 310B, 310C)). If TD 100 is processing a request to add a new Provider 150 and the associated Provider ID is already registered, validation results in failure (step 1030). Moreover, execution of the Provider Request is aborted on failure of any of the validations of steps 1005, 1010, 1015 or 1020. Otherwise, presence of the Provider ID in the record is interpreted as success (step 1040).

Addition of a Provider Account to a User Record

Preferably, to be able to request User Authentication, a Provider has to be authorized by the User. This authorization may come in the form of a Provider Account attribute attached to the User Record, as described elsewhere herein. Some Provider Accounts can also be designated as "Trusted" indicating that they are authorized to assist a User in record recovery should the User lose all of his or her Registered Devices. In some embodiments, a user record in a database maintained by a Provider 150 already has a ULID and a pair of keys created by the Provider (namely, PrK-ULID(private) and PuK-ULID(public).) Provider Account attributes in records within UL 115 are identified by a Provider ID that is a hash of PuK-ULID.

Figure 11:
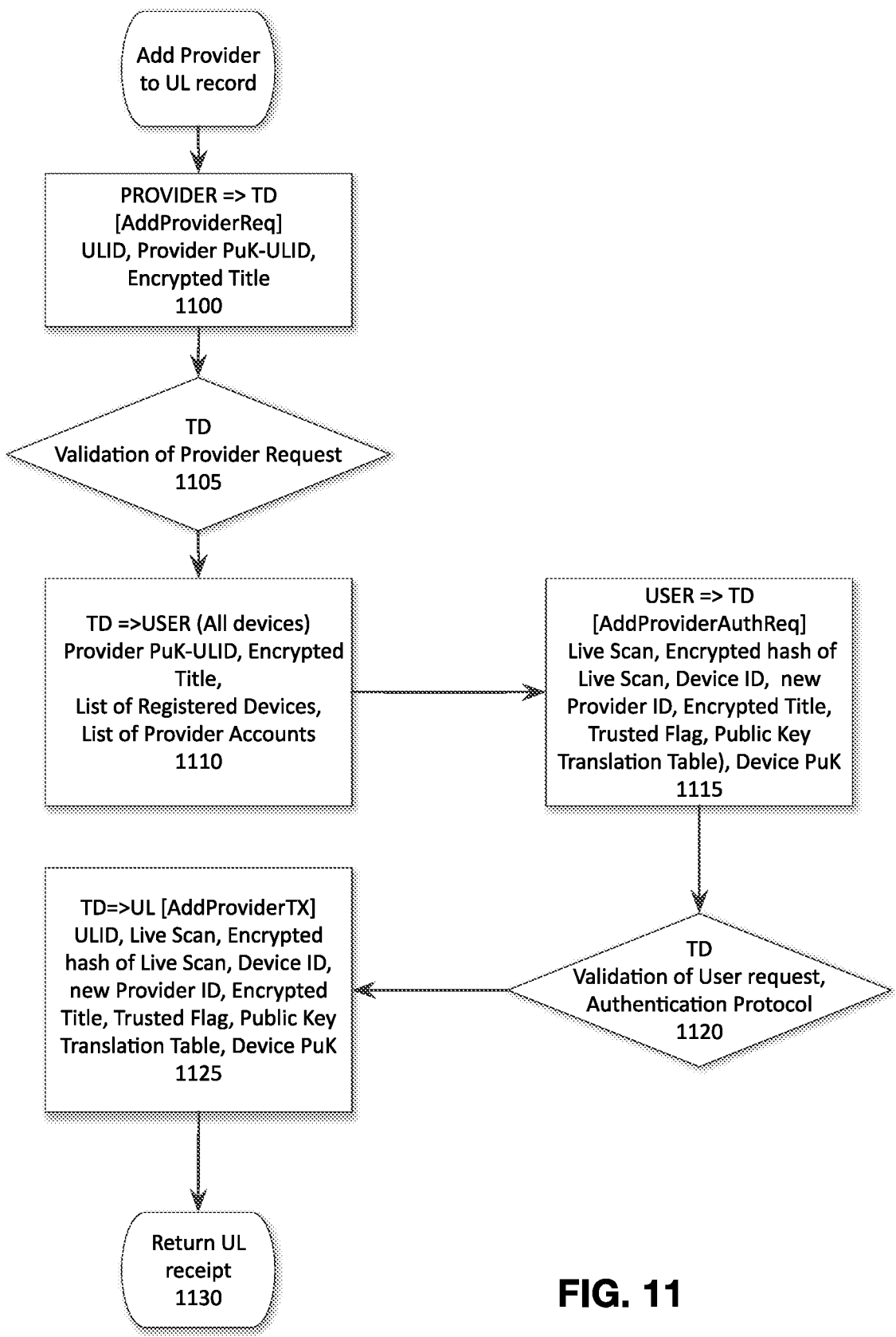
FIG. 11 is a process for adding a provider to a user ledger record.

In this context, FIG. 11 illustrates an exemplary process for addition of a Provider Account to a User record within UL 115. In step 1100, a Provider 150 sends to TD 100 an "Add Provider" request containing a user record ID (ULID), PuK-ULID, and a Provider title encrypted with PrK-ULID. In step 1105, TD 100 runs a Validation of Provider Request protocol, as described in connection with FIG. 10. In step 1110, using data from the User record retrieved by TD 100 in step 1105, TD 100 sends notifications to all User Registered Devices containing the Provider public key PuK-ULID, an encrypted title, a list of Registered Device Attributes, and a list of Provider Account attributes marked "Trusted".

In step 1115, an application running on User device 145 maintains a ULID and private/public key pair in local storage. PED 145 receives the message from TD 100 sent in step 1110, and decrypts the public keys of Trusted Providers from the list of Provider Account attributes. PED 145 further builds a Public Key Translation Table for the new Provider Account attribute. PED 145 creates a new Provider ID by hashing PuK-ULID. PED 145 then sends to TD 100 an "add provider authorized" request with Live Scan data, an encrypted hash of the Live Scan, Device ID, new Provider ID, Encrypted Title, a Trusted setting, and a Public Key Translation Table.

In step 1120, TD 100 runs protocols for Validation of User Request (as described in connection with FIG. 8) and Authentication (as described in connection with FIG. 9). In step 1125, TD 100 forwards a full copy of data received from PED 145 (and a software application executed thereby) to a smart contract 115A running on UL 115. The smart contract 115A validates the request and updates UL 115 with a new version of the User record containing a newly added Provider Account attribute. In step 1130, TD 100 receives confirmation of the transaction, relaying it to the Provider 150.

Exemplary Provider Requests for User Authentication

In an exemplary embodiment, a customer may request a service from a service provider. The service provider desires to confirm that the registered customer is indeed the person requesting the service. In such a scenario, the service provider can do so by using a biometric authentication platform that already contains a reference biometric sample of the customer. As an added benefit, the platform may allow saving of transaction details along with a record of the authentication result in an immutable log. The Provider can obtain a copy of this record at will and use it as proof of the authenticity of past transactions.

There are a wide array of business scenarios and Provider types where User Authentication requests may be beneficially used. For example, banks can add and enforce biometric authentication requirements to the process of contactless payments. In another example, biometric authentication can be added to online payments and replace or enhance the popular "3-D Secure" protocol. In yet another example, biometric authentication can be used instead of an ID card in all scenarios where a customer registers first, and obtains a product or service later, such as: gym membership, tickets purchased online, etc.

Figure 12:
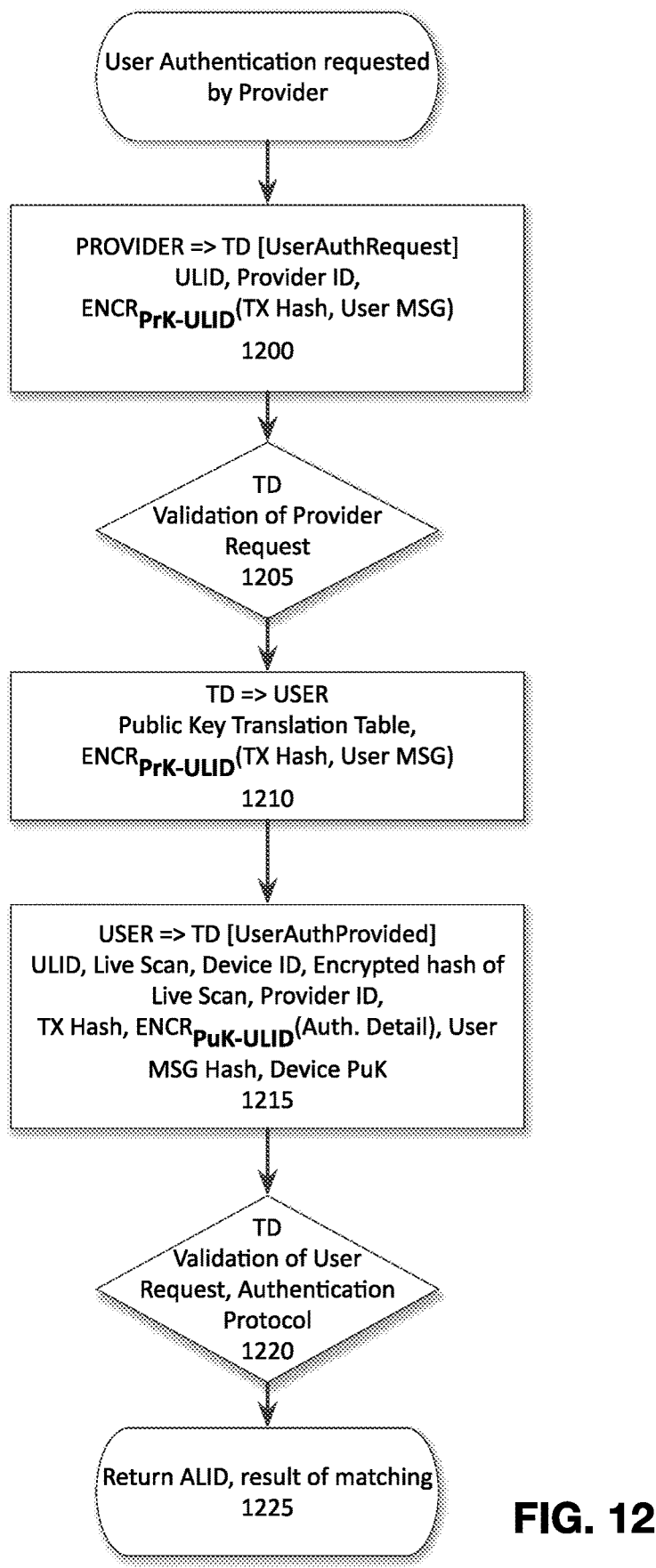
FIG. 12 is a process for user authentication requested by a provider.

FIG. 12 illustrates an exemplary process for implementation of such user authentication scenarios. In step 1200, a Provider 150 sends a "User Authentication Request" request to TD 100. The Request of step 1200 includes ULID, Provider ID, and $ENCR_{PrK-ULID}$(TX hash, User MSG). The Request may be formed by Provider 150 by, e.g., retrieval of User-specific information from a Provider-maintained database, such as ULID, private key assigned to the User by the Provider (PrK-ULID), and a corresponding public key (PuK-ULID). The Provider 150 puts together transaction details such as transaction amount, time, merchant information, and other information that may be relevant to a particular transaction. A transaction hash ("TX hash") is created by hashing this data together. This hash will subsequently be stored immutably in AL 125 as part of the Authentication request record. Provider 150 may generate a text-based message ("User MSG") that a User 140 will see on the user's PED 145, such as, "This is your bank. Please confirm the charge of $500." As described elsewhere herein, full copies of this message may be retained in the logs of the Provider application (e.g. accessible by management console 155) and the user application (e.g. executed by PED 145). Meanwhile, the hash of this message will be stored immutably in AL 125 and can be used as proof of the content of the original message. Provider 150 uses its private key to encrypt the data pair consisting of the transaction hash and the text message, to produce $ENCR_{PrK-ULID}$ (TX hash, User MSG).

In step 1205, TD 100 runs a Validation of Provider Request protocol, as described in connection with FIG. 10. In step 1210, using a User record retrieved in step 1205, TD 100 sends notification to all Registered Devices (i.e. PEDs 145) attaching the Public Key Translation Table assigned to the requesting Provider 150, and the unmodified $ENCR_{PrK-ULID}$ (TX hash, User MSG) from step 1200.

In step 1215, User 140 (via PED 145) responds to TD 100 with a User authentication response. In some embodiments, the User authentication response may be formed in accordance with the following steps. Each PED 145 maintains a ULID and private/public key pair in local storage. A user application on PED 145 hashes its hardware identifier and uses it for the Public Key Translation Table lookup. PED 145 locates a corresponding entry with the encrypted copy of the Provider public key PuK-ULID, and decrypts it using the local private key. PED 145 uses PuK-ULID to decrypt the encrypted data pair $ENCR_{PrK-ULID}$ (TX Hash, User MSG). PED 145 hashes PuK-ULID to produce the Provider ID. PED 145 may then display the decrypted User MSG on, e.g., an associated device screen. This message prompts User 140 to provide a Live Scan. PED 145 may also capture additional information in accordance with Provider requirements (e.g. local time on PED 145, phone number information, geolocation of PED 145, etc.) This additional information may be encrypted with the PuK-ULID, creating $ENCR_{PuK-ULID}$ (Auth. Detail). PED 145 hashes the User MSG. PED 145 hashes the Live Scan and encrypts the Live Scan hash with the local private key on PED 145. PED 145 may then send to TD 100 the "User authentication response" message with ULID, Live Scan, Encrypted Hash of Live Scan, Device ID, TX hash, Provider ID, encrypted authentication details, and a hash of the User MSG.

In step 1220, TD 100 performs a Validation of User Request protocol and an Authentication Protocol, as described in connection with FIGS. 8 and 9, respectively. Finally, in step 1225, TD 100 returns the ALID and matching result to the requesting Provider 150.

Exemplary Use for Biometrically Authenticated Signed Documents

In some embodiments, the biometric authentication platforms and processes described herein may be utilized for a variety of diverse applications. One such application is biometric authentication of signed documents. Transaction data that is hashed to produce a TX hash (e.g. TX hash 610, 712) may include more than just a collection of bookkeeping fields, such as "Paid to: XXX; Payee Bank: YYY; Amount paid: ###." Instead the transaction description may contain information of independent significance, such as the content of a document.

For example, AL records may be used as proof of authenticity of legal contracts, as demonstrated in the following scenario. A User 140 may be in a rental office, prepared to sign a rental agreement. The parties may sign a contract. The Rental office party to the contract may be deemed a Provider 150 and registered on UL 115. The rental office (i.e. Provider 150) may scan the signed contract, and hash the digital file corresponding to the signed contract. The hashed digital file may be used as TX hash (e.g. in fields 610 and 712). The rental office, as Provider 150, requests User Authentication, supplying a text message with the contract number as a User MSG. This process creates a record on AL 125 that permanently links the hash of the scanned contract to the User's "biometric signature". In the future, the renter (User 140) would not be able to claim that its signature on the contract is forged or otherwise inauthentic. Likewise, the rental office (Provider 150) would not be able to modify the content of the originally-signed paper document without the modification being reveals by subsequent authentication. In this way, by hashing a scanned copy of a document as the TX hash, authenticity of the document may be verified using systems and methods described herein.

Record Recovery by a Trusted Provider

Should a User 140 lose all of his or her Registered Devices, Providers designated as "Trusted" can assist in registering a new device which effectively restores a User's ability to use his or her UL record within UL 115.

FIG. 13 illustrates an exemplary process for initiating a User Record Recovery by a Trusted Provider. In step 1300, a Provider 150 sends a request to initate recovery ("InitiateRecoveryReq") to TD 100. The InitiateRecoveryReq contains a User record ID (ULID) and Provider ID. In step 1305, TD 100 runs the Validation of Provider Request protocol. If successful, in step 1310, TD 100 sends the ULID and Provider ID received in the InitiateRecoveryReq to a smart contract 115A on UL 115, which (a) changes the user record state 220 from ACTIVE to RECOVERY, and (b) creates a unique Session PIN. The Session PIN can be used in validation when a User 140 proceeds to add a new device. The Session PIN is introduced in order to ensure that a Trusted Provider and User are communicating and verifying each other while going through the protocol steps, as described. The Session PIN may be saved in registration state field 220 of a UL record, as described elsewhere herein. In step 1315, the smart contract 115A on UL 115 returns the Session PIN to TD 100, and TD 100 forwards the Session PIN to Provider 150—at which point Provider 150 waits for User 140 to register a new Device.

FIG. 14 illustrates a process via which User 140 may subsequently register a new Device. In step 1400, Provider

150 provides User 140 with the Session PIN returned in step 1315. The Session PIN may be provided, for example, in person, or via telephone. User 140 enters the Session PIN in a new PED 145, and produces a Live Scan. In step 1405, User 140 (e.g. via new Device PED 145) sends to TD 100 a request to add a recovery device ("AddRecoveryDevice-Req"), containing the Session PIN, Live Scan, an encrypted hash of the Live Scan, a hash of the device hardware identification (Device ID), and the local device public key.

In step 1410, TD 100 runs Validation of User Request and Authentication protocols, as described elsewhere herein. In step 1415, TD 100 forwards information received as a result of step 1410 to a smart contract 115A on UL 115, which updates the User record, adding a new Registered Device Attribute corresponding to the new Registered Device PED 145, thus completing the new device registration.

Figure 15:
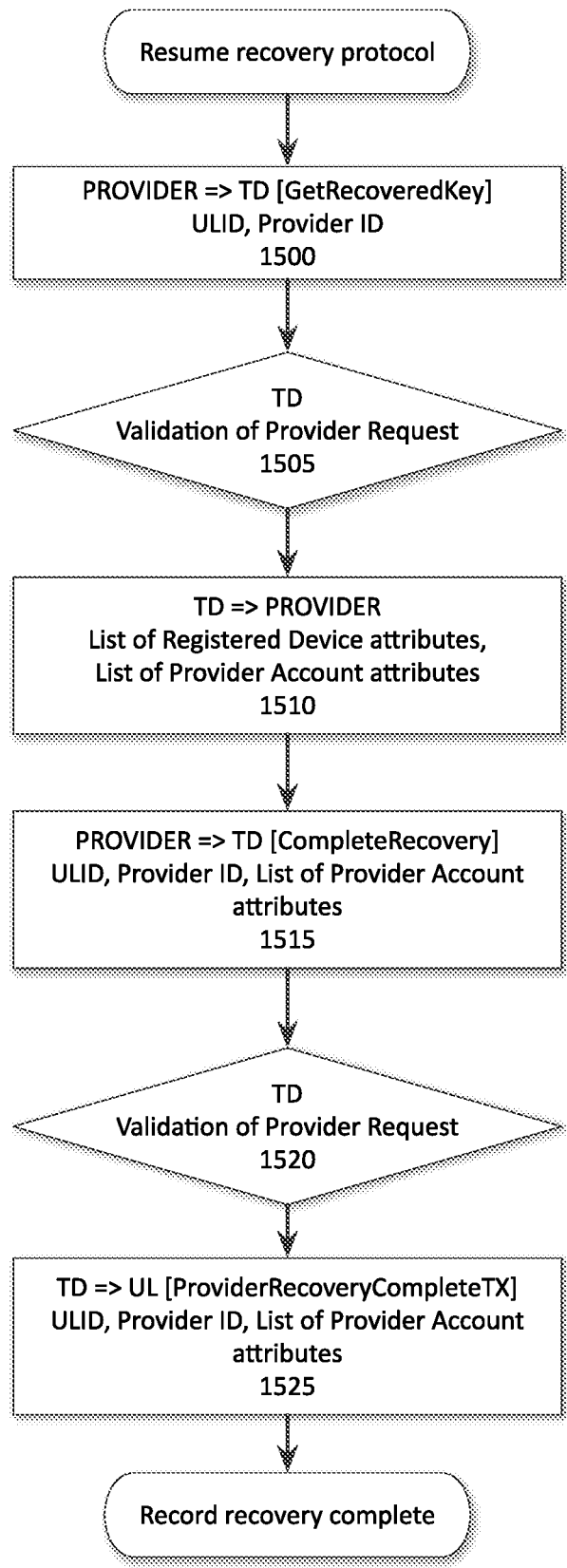
FIG. 15 is a process for completing a trusted provider user record recovery.

However, at this point, the User's Record in UL 115 is still marked in a RECOVERY status. FIG. 15 illustrates a final phase for Record Recovery by a Trusted Provider. In step 1500, Provider 150 sends to TD 100 a request to get the recovered key ("GetRecoveredKey"), which includes a ULID associated with the User record, and a Provider ID. In step 1505, TD 100 executes a Validation of Provider Request protocol. In step 1510, using data from the User record retrieved in step 1505, TD 100 replies to Provider 150, sending a list of Registered Device attributes and a list of Provider Account attributes associated with the User record. In step 1515, the Provider 150 processes the received lists, to identify the new Registered Device and its key. Provider 150 updates the Public Key Translation Table, adding entries encrypted with the public key of the new Device being added. Provider 150 then sends a "complete recovery" request to TD 100, containing the user record ULID, Provider ID, and an updated list of Provider Account Attributes. In step 1520, TD 100 runs a Validation of Provider Request protocol. Finally, in step 1525, TD 100 forwards a copy of data received by it in step 1515 to the smart contract 115A on UL 115. The smart contract in turn validates the request, updates the User record with an updated version of the list of Provider Account Attributes, and changes the User record Status field from RECOVERY to ACTIVE.

Removing Providers from a User Record

Figure 16:
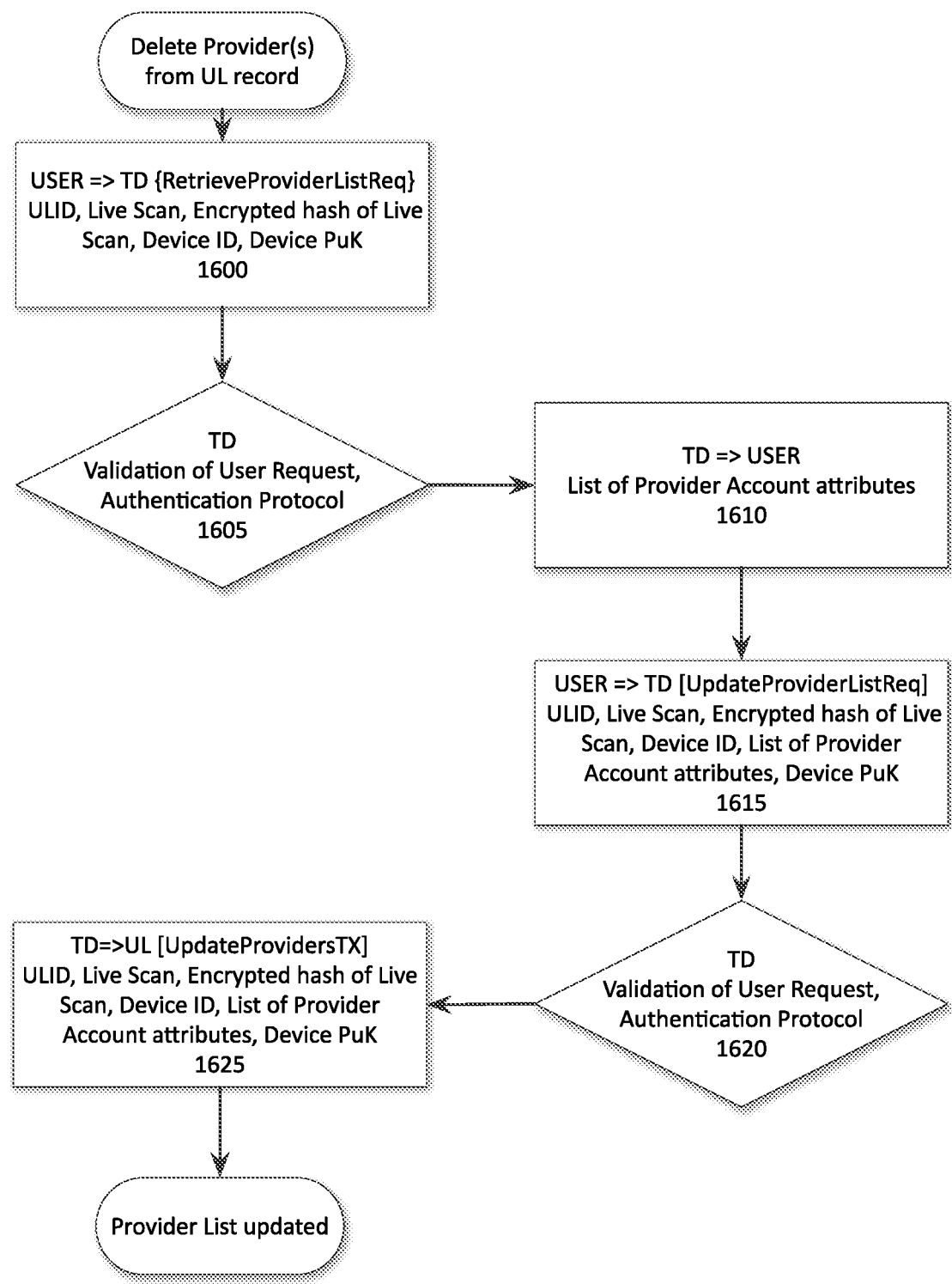
FIG. 16 is a process for removing providers from a user record provider list.

In some circumstances, a User may wish to remove one or several Provider Accounts from his or her record. Removed Providers will no longer be able to send User Authentication requests. FIG. 16 illustrates a process for such removal of Provider accounts.

In step 1600, User 140 (via PED 145) sends to TD 100 a request to retrieve a provider list ("RetrieveProviderListReq"), containing a ULID, Live Scan, encrypted hash of Live Scan, Device ID, and device public key. In step 1605, TD 100 runs Validation of User Request and Authentication protocols, as described elsewhere herein. In step 1610, using data retrieved during step 1605, TD 100 replies to User 140 with the list of Provider Account Attributes contained in the User record.

In step 1615, an application implemented by PED 145 of User 140 decrypts Provider descriptions contained within the Provider Account Attributes returned in step 1610, and displays the decrypted Provider descriptions to User 140. Using PED 145, User 140 may edit the list (including deleting one or more Providers from it) and save an updated version. User 140 then sends to TD 100 a request to update the Provider list ("UpdateProviderListReq") to TD 100, containing the ULID, Live Scan, encrypted hash of Live Scan, Device ID, and the updated list of Provider Account attributes.

In step 1620, TD 100 runs Validation of User Request and Authentication protocols, as described elsewhere herein. In step 1625, TD 100 forwards data received in step 1615 to the smart contract 115A implemented on UL 115. The smart contract validates the request and updates contents of the User record.

Addition of a New Registered Device to a User Record

Preferably, only registered devices can be used for serving User Authentication requests by Providers. A User may have any number of Registered Devices configured in his or her UL record. Typically, to add (i.e. register) a new device, the User must be in possession of one of the previously registered devices.

Figure 17:
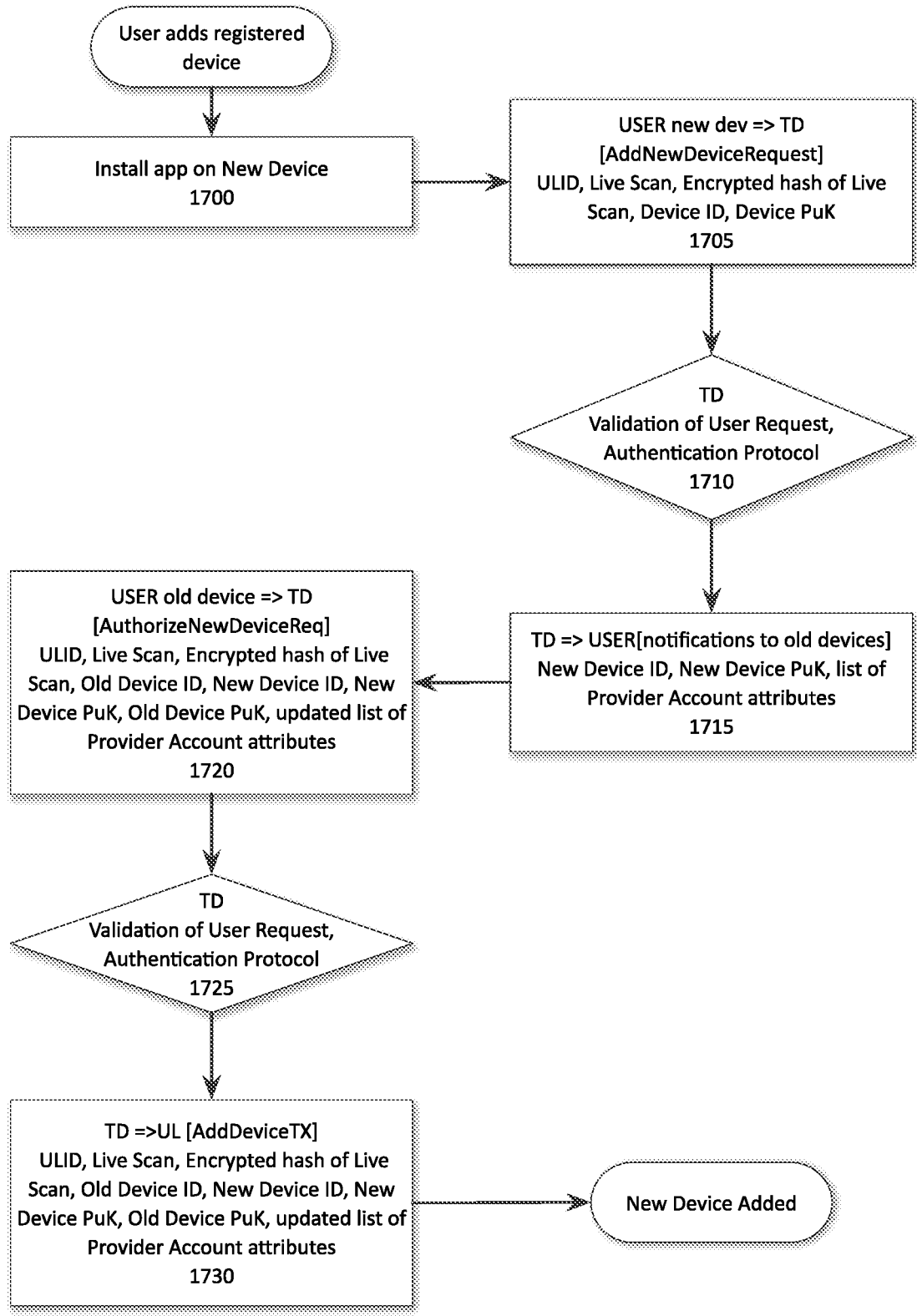
FIG. 17 is a process for adding a registered device to a user record.

FIG. 17 illustrates a process via which a user may register a new device using a previously-registered device. In step 1700, a User 140 installed an application on a new (i.e. not previously-registered) PED 145 ("New Device"), and via an application configuration process, selects an option presented on New Device to add the New Device to an existing UL account. In step 1705, New Device sends to TD 100 a request to add a new device ("AddNewDeviceReq") containing the User's ULID, Live Scan, encrypted hash of Live Scan, Device ID and Device public key. In step 1710, TD 100 runs a Validation of User Request protocol and Authentication protocol, as described elsewhere herein. In step 1715, using data from the User record retrieved in step 1710, TD 100 sends notifications to all Registered Devices associated with the User record, attaching the New Device ID, New Device PuK, and the list of Provider Account attributes.

In step 1720, User 140 uses one of the previously-registered Devices to reply to TD 100. In particular, an application on the previously-registered Device re-calculates the Provider Account attribute list, updating the Public Key Translation Tables for the New Device and its public key. User 140 (via the previously-registered Device) then sends a request to authorize the New Device to TD 100, which request includes the ULID, Live Scan, encrypted hash of the Live Scan, old Device ID, New Device ID, old Device PuK, New Device PuK, and the updated list of Provider Account Attributes.

In step 1725, TD 100 runs the Validation of User Request and Authentication Protocols, as described elsewhere herein. Finally, in step 1730, TD 100 forwards data received in step 1720 to the smart contract 115A running on UL 115. The smart contract validates the request and updates contents of the User record with the updated version of the Provider Account Attributes and a Registered Device attribute corresponding to the New Device.

Adding a New List of Trustees to a User Record

When a User 140 loses access to all of the Registered Devices, the User can no longer use services provided by various biometric authentication platforms described herein. Devices to be used for User Authentication have to be registered. To register a New Device, a User typically needs to be in possession of a previously-registered Device.

However, in some embodiments, other mechanisms may be provided for adding a New Device. One such mechanism utilizes the assistance of a Provider 150 that was previously designated by the User 140 as "Trusted". Some Users, however, may not have such a Trusted Provider. In that case, a "Trusted Circle" protocol may be utilized as another mechanism for registering a New Device and recovering the User account. A Trusted Circle protocol may use Trustee Lists containing ULIDs of Users who are designated as Trustees to send their votes confirming the identity of a User requiring addition of a New Device to their User record.

Figures 18, 19:
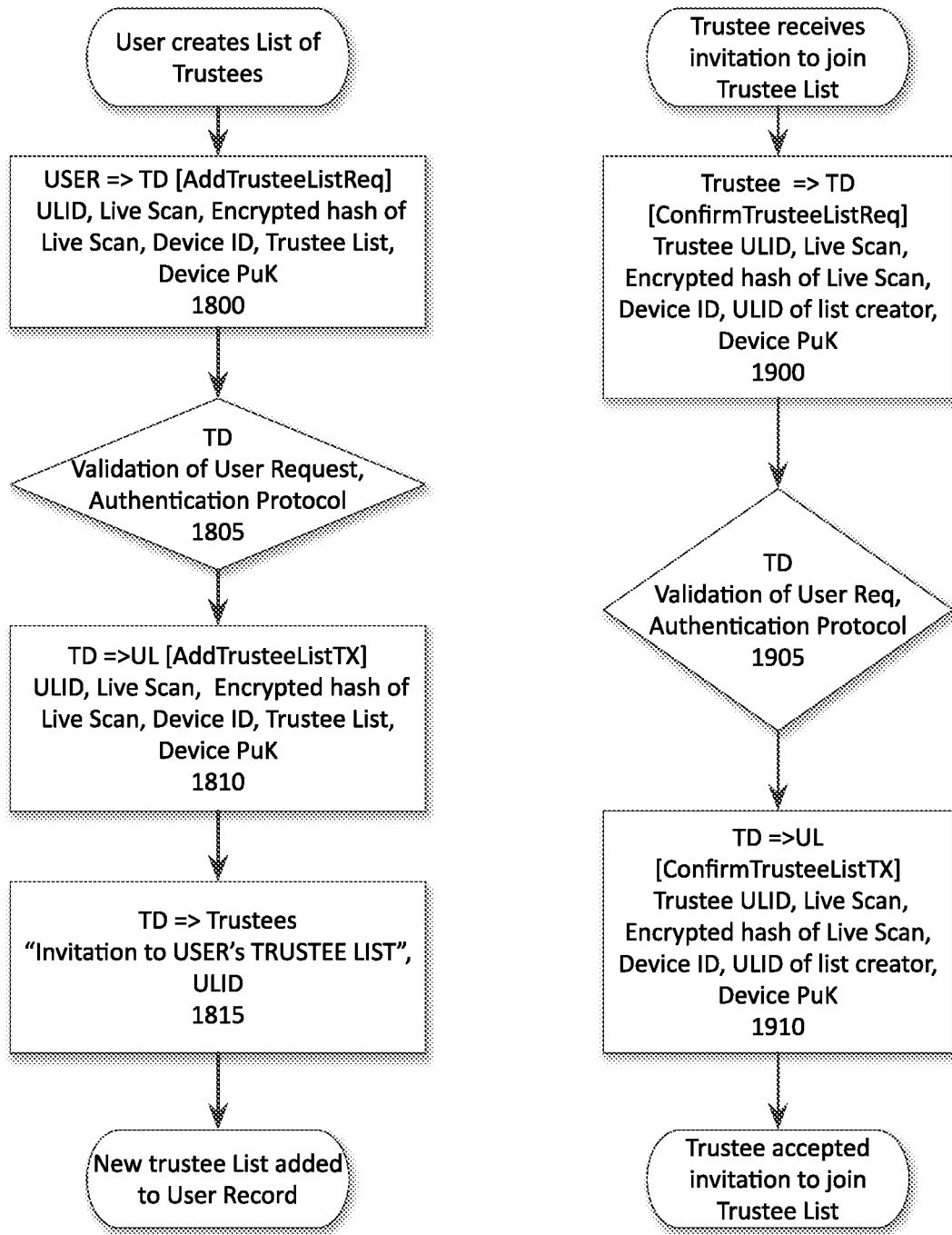
FIG. 18 is a process for creating a list of trustees.
FIG. 19 is a process for inviting a trustee to join a trustee list.

Addition of a Trustee list protocol may be implemented in two phases. During the first phase, a User 140 creates a list and the system sends out notifications to Trustees inviting them to join the list. FIG. 18 illustrates such a process. In step 1800, a User 140 configures a Trusted List on a Registered Device 145, and sends a request to add a trustee list ("AddTrusteeListReq") to TD 100. The AddTrusteeListReq includes the User's ULID, Live Scan, encrypted hash of Live Scan, Device ID, Trustee List, and Device public key. In step 1805, TD 100 runs a Validation of User Request protocol and Authentication protocol, as described elsewhere herein. In step 1810, TD 100 forwards the data received by it in step 1800 to a smart contract 115A on UL 115. The smart contract on UL 115 creates a Trustee List attribute, setting the status field of each Trustee to PENDING. The smart contract 115A on UL 115 further appends the Trustee List attribute to the User Record. In step 1815, TD 100 sends notifications to the Trustees designated in step 1800, attaching the User's ULID to an invitation to join the Trustee List.

During a second phase, each of the Trustees will respond signaling their acceptance (or refusal) of the invitation to join the User's new Trustee List. FIG. 19 illustrates such a process. In step 1900, an invited Trustee responds to the invitation of step 1815, by producing a Live Scan and sending to TD 100: a "Confirm Trustee Acceptance" request with the Trustee's ULID, Live Scan, encrypted hash of Live Scan, Device ID, ULID of Trustee List creator, and device public key. In step 1905, TD 100 performs Validation of User Request and Authentication protocols for information received from the Trustee, as described elsewhere herein. In step 1910, TD 100 forwards data received in step 1900 to a smart contract 115A on UL 115. The smart contract looks up a record belonging to the Trustee List owner and changes the status of the Trustee who responded in step 1900, from PENDING to CONFIRMED.

Trusted Circle Recovery Protocol

Figures 20, 21:
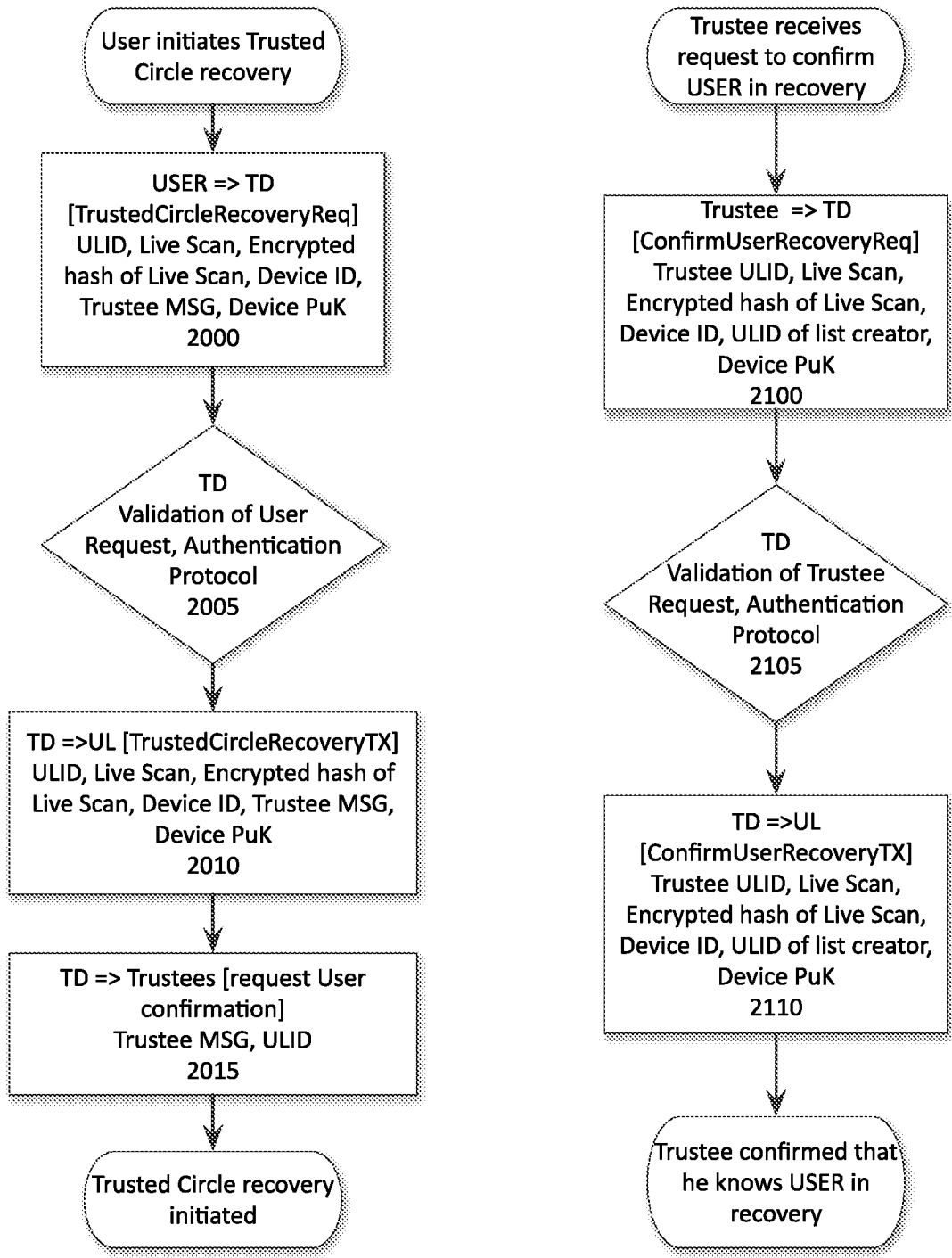
FIG. 20 is a process for initiating a trusted circle recovery of a user record.
FIG. 21 is a process for a trustee receiving a request to confirm a user.

A Trusted Circle recovery protocol may run in two phases. FIG. 20 illustrates a process that may be implemented in a first phase. In step 2000, a User 140 initiates the Trusted Circle recovery by installing an application on a new PED 145 (i.e., a New Device) and during, e.g., an initial configuration, select an option to initiate Trusted Circle recovery. To be able to use this option, User 140 must remember the alphanumeric string that was used to create ULID. Preferably, this string is something unique and easy to remember, such as an email address. User 140 may also enter a text-based message to Trustees, such as "This is Joe on a new phone. I lost my old phone. Please, confirm that you know me." User 140 produces a Live Scan from the New Device, and sends a Trusted Circle Recovery Request to TD 100, containing the ULID, Live Scan, encrypted hash of Live Scan, message to Trustees, and New Device public key.

In step 2005, TD 100 runs Validation of User Request and Authentication protocols, as described elsewhere herein. In step 2010, TD 100 forwards data received by it in step 2000 to a smart contract 115A on UL 115; smart contract 115A in turn adds the New Device to the list of Registered Devices and changes the User Record status to RECOVERY. In step 2015, using data from the User record retrieved in step 2005, TD 100 sends notifications to Trustees, attaching the requesting User's ULID and message to Trustees.

A second phase of Trusted Circle recovery is illustrated in FIG. 21, whereby each of the Trustees will respond to the notification by voting for the User whose record access is being recovered. A Trustee has received an invitation sent by TD 100 in step 2015. In step 2100, the Trustee produces a Live Scan and sends a request to Confirm User Recovery, which includes the Trustee's ULID, the Trustee's Live Scan, an encrypted hash of the Trustee's Live Scan, the Device ID, a ULID of the User being recovered, and the device public key. In step 2105, TD 100 runs the Validation of User Request and Authentication protocols, as described elsewhere herein. In step 2110, TD 100 forwards data received in step 2100 to smart contract 115A on UL 115. Smart contract 115A looks up a record of the User being recovered and marks all instances of the responding Trustee in the Record's Trusted Lists to VOTED. Every time a new vote comes in, a smart contract 115A on UL 115 checks if a minimum vote count condition in any one of the Trustee Lists has been met. If it has, voting is complete; all Trustees are reset to ACTIVE; and the User record Status changes to ACTIVE. The User can now use the New Device.

For security reasons, Trustees may not be provided with access to the public keys of Provider Accounts that would be required to decrypt Provider Account descriptions. In such embodiments, when a User with one or several Provider Accounts recovers his or her Record using the Trusted Circle protocol, the New Device will not be able to display the Trusted Account titles that would be shown during a Provider Account removal protocol. This inconvenience can be resolved by, e.g., contacting Providers and asking them to reset their registration to support the User's New Device. This restriction may be implemented intentionally, as it may be undesirable for Trustees from a Trusted Circle List to be able to read contents of the Provider Accounts configured in the record of the Trustee List creator.

Enhanced Security of Stored Biometric Samples

In some embodiments, it may be desirable to enable modification of stored Templates while preserving UL record ownership. For example, biometric data is sensitive and often considered to be irreplaceable. In modern biometric authentication systems, templates and live scans are almost always encrypted when transferred from clients to servers; and templates are stored separately from their decryption keys on the server side. This addresses the concern of data security during transportation and storage. However, during matching, templates and live scans still need to decrypted back to their original formats to be matched. If a matching node is compromised or if matching is performed on a public network, it is possible that a hacker can steal the original template. If this happens, a hacker can create a fake live scan by modifying the template in an insignificant way to spoof the matching algorithm. Since a user's biometric information does not change, once an original template is stolen, it will not be safe for the user to use the same biometrics anymore.

To address this issue, a technique may be implemented that allows a user to revoke and replace biometric templates. Such a technique may be based on scrambling biometric templates and live scans and matching the scrambled pairs directly without de-scrambling them.

A template is a mathematical representation of a user's biometric information. A matching algorithm takes input of a pair of representations and computes their similarity. Without losing generality, hereinbelow are described two commonly used representations and their associated similarity measurements.

A first type of representation is a feature vector whose similarity is computed as a function of dot product. For this example, one may denote the vectors of template and live scan as $A=[a1, a2, a3, \ldots, an]$ and $B=[b1, b2, b3, \ldots, bn]$. The similarity is computed as a function of $C=sum(a1*b1, a2*b2, a3*b3, \ldots, an*bn)$. A can be scrambled by multiplying a matrix M with the effect of swapping the order of elements and/or adding different coefficients to different elements. For instance A'=[k2*a2, k1*a1, kn*an, . . . , k3*a3]. B can be scrambled by multiplying the inverse of M, M', B'=[a2/k2, a1/k1, an/kn, . . . , a3/k3]. Similarity C'=sum (a2*b2, a1*b1, an*bn, . . . , a3*b3)=C.

A second type of representation is a Fourier transform vector. Denote the vectors of template and live scan as A=[a1*exp(−i*α1), a2*exp(−i*α2), . . . , an*exp(−i*αn)] and B=[b1*exp(4*(31), b2*exp(−i*β2), . . . , bn*exp(−i*βn)]. Similarity is computed as a function of the element-wise product, C=[a1*b1*exp(−i*(α1+β1)), a2*b2*exp(−i*(α2+β2)), . . . , an*bn*exp(−i*(αn+βn))]. Similar to the method described in the previous section, we can multiply A and B with a scramble vector M and its element-wise inverse vector M'. A'=[k1*a1*exp(−i*α1−i*Ω1), k2*a2*exp(−i*a2−i*Ω2), . . . , k2*an*exp(−i*αn−i*Ωn)] and B'=[a1/k1*exp(−i*β1+i*Ω1), a2/k2*exp(−i*(32+i*Ω2), . . . , an/kn*exp(−i*βn+i*Ωn)]. The element-wise product C' will be the same as C. Note that in image processing, Fourier transform is often computed as 2D matrices instead of 1D vectors. However the above technique is still applicable as the rows of a 2D matrix can be concatenated into a single vector. We can then apply the same element-wise operation above and reshape the result vector back into a 2D matrix of the original form.

Figures 22, 23:
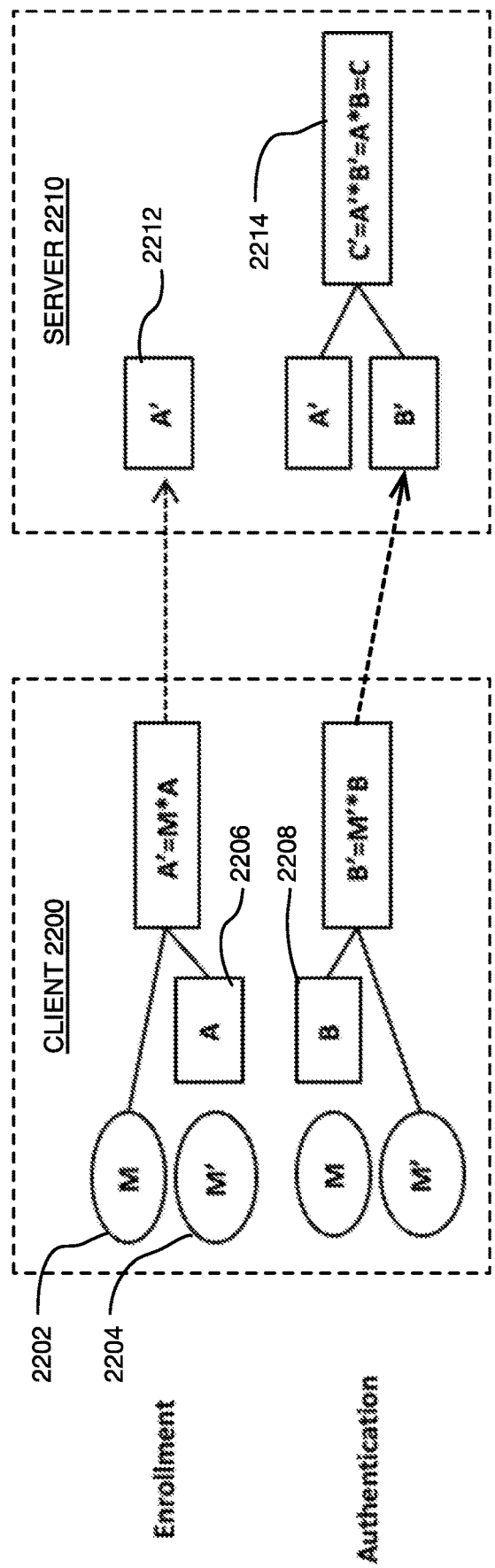
FIG. 22 is a process for applying a scrambling technique within a biometric authentication platform.
FIG. 23 is a user ledger record portion enabling application of a scrambling technique.

FIG. 22 shows how to apply the scrambling technique to the proposed biometric authentication system. During enrollment, a client app 2200 randomly generates a scramble matrix/vector M (2202) and its inverse (2204) and stores them locally. Upon capturing the biometric template A (2206), the client app calculates a scrambled template A' by scrambling A using M, and sends the scrambled template A' to the server 2210. The server saves A' as a template 2212. During authentication, the client app 2200 captures a live scan B (2208), scrambles it with M' and sends the scrambled live scan B' to the server 2210 for matching. The server 2210 fetches A' and matches it with B'. The result 2214 will be the same as matching the unscrambled A and B.

Scramble matrix/vector M is irreversible, i.e., one cannot derive the original template and live scan A and B from their scrambled representations A' and B' without knowing M and M'. Since M is only used to scramble the template and can be discarded afterwards, and M' is only stored in an encrypted format and can only be recovered by registered devices using their own private keys, and A' and B' are matched without de-scrambling on the server side, even when a server node is compromised, the hacker can only get access to A' and B' but will not be able to recover A and B. Thus, the original biometric sample and live scan remain secure. After such a hack is detected, the user can simply revoke the enrolled template A', generate a new pair of M and M', then re-enroll. The hacker will not be able to spoof the system by resending slightly modified version of A' or B' as the new template is scrambled using a completely different matrix/vector. Since M and M' are randomly generated, there are infinite number of pairs. So the user can revoke biometric templates as many times as he/she wants to.

In one embodiment, User 140 can create a separate UL record for each registered device. In this configuration, M' can be stored locally in the registered device. In other embodiments, a UL record is associated with multiple registered devices. To implement this approach, a M' field will be stored in an encrypted format as a part of a UL record. The technique used to store it will be analogous to the Public Key Translation Table. Each registered device will be able to load an encrypted M' and decrypt it with its local private key. FIG. 23 illustrates an example of two registered device attributes 2300A and 2300B that may be appended to a UL record. Attribute 2300A contains Device 1 ID 2302A, encryption key 2305A (PuK-Dev1), a field 2310A with M' encrypted with PuK-Dev1. Similarly, attribute 2300B stores M' for a second registered device in field 2310B, along with Device 2 ID 2302B and encryption key 2305B (PuK-Dev2).

To support this enhancement, most protocols will require a minor modification wherein before submitting a Live Scan, the User 140 will obtain a copy of the encrypted M' from UL 115 via TD 100. UL 115 may be queried for encrypted M' in the same manner as described elsewhere herein.

Proving Authenticity of Matching Results by Inserting Test Tasks

While the consensus protocol over a decentralized framework is usually sufficient to guarantee the authenticity of a matching result, to further enhance security, an additional technique can be applied to verify whether a processing node faithfully reported the authentic matching result. This can be particularly useful when matching is performed over a public network or when the consensus protocol only requires votes from a small number of nodes.

Figure 24:
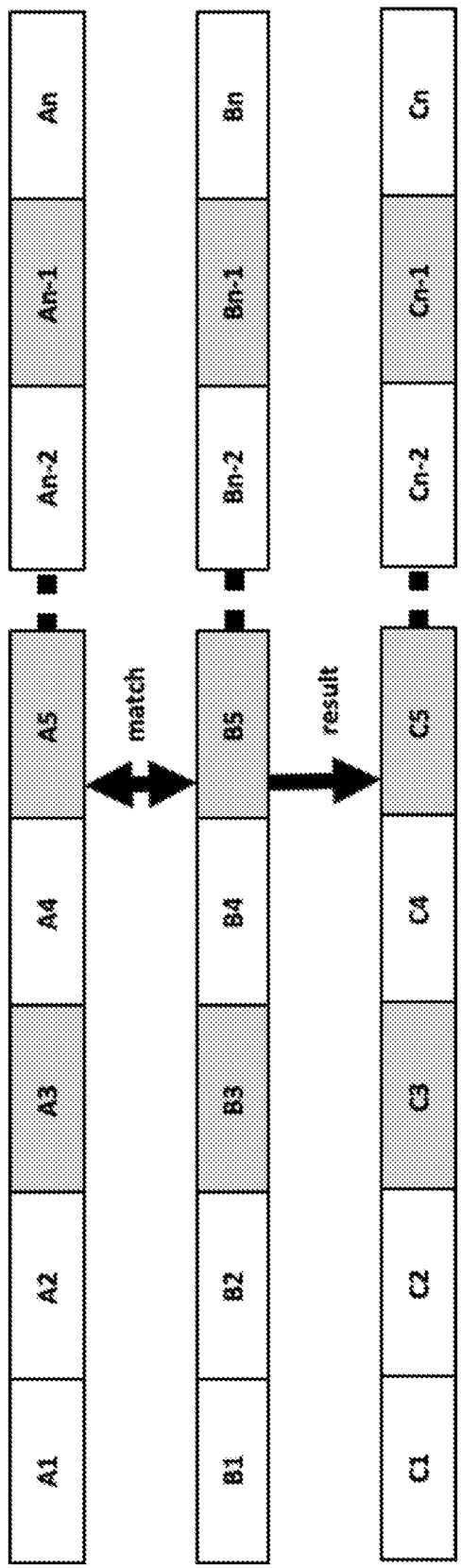
FIG. 24 is schematic illustration illustrating insertion of test tasks to prove authenticity of matching results.

When passing template and live scan pairs to AL 125 for matching, TD 100 can insert testing pairs whose matching results are known to TD 100 as shown in FIG. 24. A and B are two sets of biometric scans that TD 100 sends to AL 125, one as templates and the other as live scans. The notation is abstract. Their elements can be whole biometric scans or sub-pieces. The sets can be sent simultaneously as a single task or can be sent over time as TD 100 continues to send matching requests to AL 125. There are two types of elements. The shaded ones represent testing template and live scan pairs whose matching results are known to TD 100. The others represent normal pairs whose matching results are unknown. Testing pairs can be randomly generated by TD 100 and their results are computed by TD 100 using the same matching algorithm that AL 125 uses. Or TD 100 can store previous biometric scans and their matching results that have been verified and use them as future testing data.

By matching the reported and known results of the testing pairs, TD 100 can decide whether a node or even the entire ledger has been compromised with high confidence. When the result is in the format of a Boolean value, n testing pairs can verify the authenticity to the accuracy of $1/(2^n)$. Or when the result is a floating point value, a single testing pair is usually enough.

While certain embodiments of the invention have been described herein in detail for purposes of clarity and understanding, the foregoing description and Figures merely explain and illustrate the present invention and the present invention is not limited thereto. It will be appreciated that those skilled in the art, having the present disclosure before them, will be able to make modifications and variations to that disclosed herein without departing from the scope of the invention or appended claims.

The invention claimed is:

1. A method for biometric authentication of a user utilizing a computer network-enabled user computing device conducting a transaction with a provider using a provider computing device, comprising:
   receiving, by a network-connected transaction director from the provider computing device, the provider request comprising a user record identifier associated with the user and a provider identifier associated with the provider, wherein the transaction director comprises a server computer electronically connected via the network to the provider computing device, wherein the transaction director further comprises a gateway to a first distributed user ledger (UL) and a second distributed authentication ledger (AL) wherein each ledger comprises a computing system that electronically communicatively links a plurality of computing devices as nodes on a blockchain;

querying the UL implemented by the plurality of network-connected UL nodes, for a user record associated with the user record identifier, the user record comprising a biometric template of the user, wherein the biometric template was captured and stored immutably on the UL during the user's registration with the platform;

receiving, by the transaction director, from the user computing device, a live scan biometric sample;

transmitting, from the transaction director to the AL implemented by a plurality of network-connected AL nodes comprising a plurality of processor nodes, an authentication request comprising the biometric template and live scan biometric sample;

comparing, by the plurality of AL processor nodes, the biometric template and the live scan biometric sample, to produce a matching result, wherein each of the plurality of AL processor nodes comprises a processor server executing a biometric matching algorithm;

receiving, from the AL processor nodes, the matching result comprising a comparison between the biometric template and live scan biometric sample; and storing immutably, within the AL by the AL nodes, an authentication transaction record comprising the matching result, a hash of the biometric template, and a hash of the live scan biometric sample.

2. The method of claim 1, wherein the processor nodes comprise a compute cluster formed from a plurality of processor nodes, and wherein the matching result is determined by the compute cluster according to consensus rules.

3. The method of claim 1, further comprising storing, by said one or more AL processor nodes, an authentication transaction record comprising the encrypted biometric template and the encrypted live scan biometric sample.

4. The method of claim 1, in which the step of querying a distributed UL comprises querying a UL node attached to the transaction director.

5. The method of claim 1, further comprising: transmitting an authentication outcome based on the matching result to the provider computing device.

6. The method of claim 5, wherein the transaction director is a first transaction director, further comprising: verifying operation of the first transaction director by a provider, by:
transmitting, by the provider computing device, to a second transaction director, a request to read back the matching result from the AL;
receiving a matching result from the second transaction director; and
determining whether the matching result from the second transaction director matches the authentication outcome from the first transaction director.

7. The method of claim 1, wherein the user computing device is a personal electronic device.

8. The method of claim 1, wherein the user computing device is a trusted shared device.

9. The method of claim 8, in which the trusted shared device is a bank automated teller machine.

10. The method of claim 1, wherein the step of querying a distributed user ledger further comprises determining whether the provider is previously authorized by the user via biometric authentication to access the user record.

11. The method of claim 10, wherein the step of determining whether the provider is previously authorized comprises comparing a public key received within the provider request to a hash of a provider public key stored within the user record.

12. The method of claim 1, in which the step of receiving a live scan biometric sample further comprises verifying that the user computing device is previously authorized by the user to provide a live scan.

13. The method of claim 1, in which the step of receiving a provider request further comprises verifying that the provider is previously authorized by the user to request authentication of the user.

14. The method of claim 1, in which the biometric template comprises user original biometric template previously scrambled by a first scrambling matrix; and
the step of receiving a live scan biometric sample comprises receiving an original biometric live scan from the user scrambled by a second scrambling matrix;
whereby the first scrambling matrix and the second scrambling matrix are selected such that the matching result of the user original biometric template previously scrambled by a first scrambling matrix and the original biometric live scan from the user scrambled by a second scrambling matrix is the same as the matching result of the original biometric template and the original biometric live scan.

15. The method of claim 14 wherein the first and second scrambling matrix are both stored in the user device and unknown to the AL, transaction director and UL.

16. The method of claim 15, further comprising:
regenerating, by the user, a new pair of scrambling matrices;
revoking the biometric template from the UL; and
replacing the biometric template within the user record with a new biometric template that is scrambled by one of the new scrambling matrices.

17. An apparatus for biometric authentication of a user via a digital communications network, comprising:
a plurality of computer network-connected user ledger node computers communicating electronically as nodes on a blockchain to implement a distributed user ledger (UL), the UL comprising a user record immutably storing an encrypted biometric template associated with the user, wherein the biometric template was captured and stored immutably on the UL during the user's registration with a platform;
a plurality of computer network-connected authentication ledger node computers communicating electronically as nodes on a blockchain to implement a distributed authentication ledger (AL), the AL node computers comprising processor computers implementing one or more biometric matching algorithms for comparing the biometric template of a user with a live scan biometric sample; and
a computer network-connected transaction director comprising a computer with an attached UL node and an attached AL node, the transaction director comprising a computer electronically connected via the network to a provider computing device, the transaction director being configured to retrieve a biometric template associated with a user from the UL, and forward the biometric template with a live scan biometric sample received from the user at the time of authentication to a compute cluster comprising one or more AL processor computers for comparison of the live scan biometric sample to the biometric template, the transaction director further receiving a matching result from the one or more AL processor computers;

wherein the AL node computers are further configured to store within an immutable distributed AL, a transaction record comprising a hash of the biometric template, a hash of the live scan biometric sample, and the matching result.

18. The apparatus of claim 17, wherein the AL processor computers within the compute cluster are configured to store a transaction record comprising the biometric template and the live scan biometric sample.

19. The apparatus of claim 17, in which plurality of network-connected user ledger node computers are configured to implement a smart contract invoked by the transaction director to modify one or more records within the UL.

20. The apparatus of claim 17, wherein the transaction director further comprises a web interface for programmatic network-based communications with a user computing device and a provider computing device.

21. The apparatus of claim 17, further comprising a plurality of transaction directors; wherein the provider may verify a biometric authentication result sent from one transaction director by requesting that a different transaction director read back an authentication result from the AL.

22. The apparatus of claim 17, in which the transaction director is stateless relative to the AL and the UL.

23. The apparatus of claim 17, in which the user record further comprises one or more registered device attributes, each identifying a computing device authorized to produce a live scan biometric sample for a particular user.

24. The apparatus of claim 23, in which the registered device attributes each comprise a hash of a hardware and/or software identifier uniquely associated with a registered device, and a public key corresponding to a private key stored locally on the registered device.

25. The apparatus of claim 17, in which the user record further comprises one or more provider account attributes, each provider account attribute identifying a provider authorized to authenticate transactions with the user.

26. The apparatus of claim 25, in which each provider account attribute comprises a unique provider identifier, a provider descriptor, and a public key translation table.

* * * * *